US008857118B2

(12) United States Patent
Constantz et al.

(10) Patent No.: US 8,857,118 B2
(45) Date of Patent: *Oct. 14, 2014

(54) HYDRAULIC CEMENTS COMPRISING CARBONATE COMPOUND COMPOSITIONS

(75) Inventors: Brent R. Constantz, Portola Valley, CA (US); Cecily Ryan, San Jose, CA (US); Laurence Clodic, Sunnyvale, CA (US)

(73) Assignee: Calera Corporation, Los Gatos, CA (US)

( * ) Notice: Subject to any disclaimer, the term of this patent is extended or adjusted under 35 U.S.C. 154(b) by 939 days.

This patent is subject to a terminal disclaimer.

(21) Appl. No.: 12/908,095

(22) Filed: Oct. 20, 2010

(65) Prior Publication Data

US 2011/0054084 A1    Mar. 3, 2011

Related U.S. Application Data

(63) Continuation of application No. 12/700,076, filed on Feb. 4, 2010, now Pat. No. 7,906,028, and a continuation of application No. 12/126,776, filed on May 23, 2008, now Pat. No. 7,735,274.

(60) Provisional application No. 60/931,657, filed on May 24, 2007, provisional application No. 60/937,786, filed on Jun. 28, 2007, provisional application No. 61/017,419, filed on Dec. 28, 2007, provisional application No. 61/017,371, filed on Dec. 28, 2007.

(51) Int. Cl.
   *C04B 14/26*     (2006.01)
   *C04B 28/04*     (2006.01)
   *C01F 11/18*     (2006.01)

(52) U.S. Cl.
   CPC .......... *C04B 28/04* (2013.01); *C04B 14/26* (2013.01)
   USPC ...... 52/223.6; 52/294; 52/309.12; 52/309.17; 106/713; 106/738; 106/739; 106/817; 423/220; 423/232; 423/419.1; 423/430

(58) Field of Classification Search
   CPC ...... C01F 11/18; C01F 11/181; C01F 11/182; C01F 11/185; C04B 14/26; C04B 14/28; C04B 16/00; C04B 16/04; C04B 7/345; C04B 7/02; C04B 14/00; C04B 28/04; C04B 7/00; C04B 7/003; C04B 7/34; C04B 7/424

USPC .......... 52/220.1, 223.6, 294, 306, 309.12, 52/309.17, 745.05; 95/129, 134, 135, 95/141–143; 106/461, 462, 638, 705, 708, 106/713–715, 718, 723, 738, 739, 106/811–818; 210/702, 710, 714, 717, 718, 210/724, 726, 749, 768–774, 748.01, 806; 404/17, 34, 44; 423/155, 165, 173, 423/220, 230, 232, 158, 242.1, 243.01, 423/245.1, 419.1, 430–432, 402
See application file for complete search history.

(56) References Cited

U.S. PATENT DOCUMENTS 394,663 A    12/1888  Rigby
935,418 A     9/1909  Sisson
(Continued)

FOREIGN PATENT DOCUMENTS

AU    2007100157 A4    4/2007
DE      19631794 A1    8/1997
(Continued)

OTHER PUBLICATIONS

European search report dated Mar. 17, 2010 for EP Application No. 08756252.6.
(Continued)

*Primary Examiner* — Joseph Drodge
(74) *Attorney, Agent, or Firm* — Vandana Bansal; Calera Corporation

(57) ABSTRACT

Hydraulic cement compositions that include a carbonate compound composition, e.g., a salt-water derived carbonate compound composition containing crystalline and/or amorphous carbonate compounds, are provided. Also provided are methods of making and using the hydraulic cements, as well as settable compositions, such as concretes and mortars, prepared therefrom. The cements and compositions produced therefrom find use in a variety of applications, including use in a variety of building materials and building applications.

16 Claims, 9 Drawing Sheets

(56) References Cited

U.S. PATENT DOCUMENTS

| | | | |
|---|---|---|---|
| 1,678,345 A | | 7/1928 | Mattison |
| 1,897,725 A | | 2/1933 | Gaus et al. |
| 2,082,101 A | * | 6/1937 | Dougherty .................... 423/163 |
| 2,164,871 A | | 7/1939 | Eichenlaub |
| 2,304,391 A | | 12/1942 | Zimmerman et al. |
| 2,342,666 A | | 2/1944 | Heath et al. |
| 2,458,039 A | | 1/1949 | Wait et al. |
| 3,075,828 A | | 1/1963 | Kato et al. |
| 3,120,426 A | | 2/1964 | Crawford, Jr. |
| 3,202,522 A | | 8/1965 | Yang et al. |
| 3,350,292 A | | 10/1967 | Weinberger et al. |
| 3,402,225 A | * | 9/1968 | Cameron et al. ............. 106/754 |
| 3,511,595 A | | 5/1970 | Fuchs |
| 3,525,675 A | | 8/1970 | Gaudin |
| 3,627,480 A | | 12/1971 | Birchall |
| 3,630,762 A | | 12/1971 | Olton et al. |
| 3,861,928 A | | 1/1975 | Slater et al. |
| 4,054,464 A | * | 10/1977 | Thorn et al. .................. 106/739 |
| 4,246,075 A | | 1/1981 | Hilbertz |
| 4,440,605 A | * | 4/1984 | Hilbertz ........................ 205/115 |
| 4,450,009 A | | 5/1984 | Childs et al. |
| 4,452,635 A | | 6/1984 | Noshi et al. |
| 4,588,443 A | | 5/1986 | Bache |
| 4,844,164 A | | 7/1989 | Shen |
| 4,899,544 A | | 2/1990 | Boyd |
| 5,230,734 A | | 7/1993 | Kumasaka et al. |
| 5,322,562 A | | 6/1994 | Ellenberger et al. |
| 5,364,611 A | | 11/1994 | Iijima et al. |
| 5,376,343 A | | 12/1994 | Fouche |
| 5,518,540 A | * | 5/1996 | Jones, Jr. ...................... 106/638 |
| 5,520,898 A | | 5/1996 | Pinnavaia et al. |
| 5,531,821 A | | 7/1996 | Wu |
| 5,584,923 A | | 12/1996 | Wu |
| 5,584,926 A | * | 12/1996 | Borgholm et al. ............ 106/713 |
| 5,690,729 A | | 11/1997 | Jones, Jr. |
| 5,766,339 A | | 6/1998 | Babu et al. |
| 5,792,440 A | | 8/1998 | Huege |
| 5,803,894 A | | 9/1998 | Kao et al. |
| 5,855,666 A | * | 1/1999 | Kao et al. ...................... 106/718 |
| 5,897,704 A | | 4/1999 | Baglin |
| 5,965,201 A | | 10/1999 | Jones, Jr. |
| 6,022,517 A | * | 2/2000 | Fairchild et al. ............. 423/432 |
| 6,180,012 B1 | | 1/2001 | Rongved |
| 6,200,379 B1 | | 3/2001 | Strabala |
| 6,200,381 B1 | | 3/2001 | Rechichi |
| 6,248,166 B1 | * | 6/2001 | Solsvik ......................... 106/737 |
| 6,264,736 B1 | * | 7/2001 | Knopf et al. .................. 106/682 |
| 6,264,740 B1 | | 7/2001 | McNulty, Jr. |
| 6,331,207 B1 | | 12/2001 | Gebhardt |
| 6,387,174 B2 | | 5/2002 | Knopf et al. |
| 6,402,831 B1 | | 6/2002 | Sawara et al. |
| 6,451,105 B1 | | 9/2002 | Turpin, Jr. |
| 6,461,632 B1 | | 10/2002 | Gogolewski |
| 6,517,631 B1 | | 2/2003 | Bland |
| 6,723,162 B1 | | 4/2004 | Cheyrezy et al. |
| 6,776,972 B2 | | 8/2004 | Vohra et al. |
| 6,890,497 B2 | | 5/2005 | Rau et al. |
| 6,908,507 B2 | | 6/2005 | Lalande et al. |
| 7,132,090 B2 | | 11/2006 | Dziedzic et al. |
| 7,135,604 B2 | | 11/2006 | Ding et al. |
| 7,261,912 B2 | | 8/2007 | Zeigler |
| 7,282,189 B2 | | 10/2007 | Zauderer |
| 7,347,896 B2 | | 3/2008 | Harrison |
| 7,427,449 B2 | | 9/2008 | Delaney et al. |
| 7,595,001 B2 | | 9/2009 | Arakel et al. |
| 7,735,274 B2 | | 6/2010 | Constantz et al. |
| 7,744,761 B2 | | 6/2010 | Constantz et al. |
| 7,749,476 B2 | | 7/2010 | Constantz et al. |
| 7,753,618 B2 | | 7/2010 | Constantz et al. |
| 7,754,169 B2 | | 7/2010 | Constantz et al. |
| 7,771,684 B2 | | 8/2010 | Constantz et al. |
| 7,790,012 B2 | | 9/2010 | Kirk et al. |
| 7,815,880 B2 | | 10/2010 | Constantz et al. |
| 7,829,053 B2 | | 11/2010 | Constantz et al. |
| 7,875,163 B2 | | 1/2011 | Gilliam et al. |
| 7,887,694 B2 | | 2/2011 | Constantz et al. |
| 7,906,028 B2 | | 3/2011 | Constantz et al. |
| 7,914,685 B2 | | 3/2011 | Constantz et al. |
| 7,922,809 B1 | | 4/2011 | Constantz et al. |
| 7,931,809 B2 | | 4/2011 | Constantz et al. |
| 7,939,336 B2 | | 5/2011 | Constantz et al. |
| 7,966,250 B2 | | 6/2011 | Constantz et al. |
| 7,993,500 B2 | | 8/2011 | Gilliam et al. |
| 7,993,511 B2 | | 8/2011 | Gilliam et al. |
| 8,006,446 B2 | | 8/2011 | Constantz et al. |
| 8,062,418 B2 | | 11/2011 | Constantz et al. |
| 8,114,214 B2 | | 2/2012 | Constantz et al. |
| 8,137,444 B2 | | 3/2012 | Farsad et al. |
| 8,333,944 B2 | | 12/2012 | Constantz et al. |
| 8,431,100 B2 | | 4/2013 | Constantz et al. |
| 8,470,275 B2 | | 6/2013 | Constantz et al. |
| 2001/0022952 A1 | | 9/2001 | Rau et al. |
| 2001/0023655 A1 | * | 9/2001 | Knopf et al. .................. 106/792 |
| 2002/0009410 A1 | | 1/2002 | Mathur |
| 2002/0164280 A1 | | 11/2002 | Kinnen et al. |
| 2003/0017088 A1 | | 1/2003 | Downs et al. |
| 2003/0123930 A1 | | 7/2003 | Jacobs et al. |
| 2003/0213937 A1 | | 11/2003 | Yaniv |
| 2004/0014845 A1 | | 1/2004 | Takamura et al. |
| 2004/0040671 A1 | | 3/2004 | Duesel, Jr. et al. |
| 2004/0126293 A1 | | 7/2004 | Geerlings et al. |
| 2004/0139891 A1 | | 7/2004 | Merkley et al. |
| 2004/0213705 A1 | | 10/2004 | Blencoe et al. |
| 2004/0228788 A1 | | 11/2004 | Nagai et al. |
| 2004/0234443 A1 | * | 11/2004 | Chen et al. .................... 423/432 |
| 2004/0259231 A1 | | 12/2004 | Bhattacharya |
| 2004/0267077 A1 | | 12/2004 | Ding et al. |
| 2005/0002847 A1 | | 1/2005 | Maroto-Valer et al. |
| 2005/0011770 A1 | | 1/2005 | Katsuyoshi et al. |
| 2005/0036932 A1 | | 2/2005 | Takahashi et al. |
| 2005/0087496 A1 | | 4/2005 | Borseth |
| 2005/0103234 A1 | | 5/2005 | McNulty, Jr. |
| 2005/0118081 A1 | | 6/2005 | Harris et al. |
| 2005/0129606 A1 | | 6/2005 | Mitsuhashi et al. |
| 2005/0180910 A1 | | 8/2005 | Park et al. |
| 2005/0232855 A1 | | 10/2005 | Stevens et al. |
| 2005/0238563 A1 | | 10/2005 | Eighmy et al. |
| 2006/0048517 A1 | | 3/2006 | Fradette et al. |
| 2006/0051274 A1 | | 3/2006 | Wright et al. |
| 2006/0105082 A1 | | 5/2006 | Zeigler |
| 2006/0165583 A1 | | 7/2006 | Makino et al. |
| 2006/0169177 A1 | | 8/2006 | Jardine et al. |
| 2006/0185516 A1 | | 8/2006 | Moriyama et al. |
| 2006/0185985 A1 | | 8/2006 | Jones |
| 2006/0196836 A1 | | 9/2006 | Arakel et al. |
| 2007/0028811 A1 | | 2/2007 | Luke et al. |
| 2007/0053821 A1 | | 3/2007 | Gillman et al. |
| 2007/0056487 A1 | | 3/2007 | Anthony et al. |
| 2007/0163443 A1 | | 7/2007 | Moriyama et al. |
| 2007/0202032 A1 | | 8/2007 | Geerlings et al. |
| 2007/0217981 A1 | | 9/2007 | Van Essendelft |
| 2007/0261947 A1 | | 11/2007 | Geerlings et al. |
| 2007/0289744 A1 | * | 12/2007 | Bingamon et al. ............ 166/293 |
| 2008/0031801 A1 | | 2/2008 | Lackner et al. |
| 2008/0112868 A1 | | 5/2008 | Blencoe et al. |
| 2008/0138265 A1 | | 6/2008 | Lackner et al. |
| 2008/0236143 A1 | | 10/2008 | Lo |
| 2008/0245660 A1 | | 10/2008 | Little et al. |
| 2008/0245672 A1 | | 10/2008 | Little et al. |
| 2008/0248350 A1 | | 10/2008 | Little et al. |
| 2008/0275149 A1 | | 11/2008 | Ladely et al. |
| 2008/0277319 A1 | | 11/2008 | Wyrsta |
| 2008/0289495 A1 | | 11/2008 | Eisenberger et al. |
| 2009/0010827 A1 | | 1/2009 | Geerlings et al. |
| 2009/0202410 A1 | | 8/2009 | Kawatra et al. |
| 2010/0051859 A1 | | 3/2010 | House et al. |
| 2010/0084280 A1 | | 4/2010 | Gilliam et al. |
| 2010/0132556 A1 | | 6/2010 | Constantz et al. |
| 2010/0132591 A1 | | 6/2010 | Constantz et al. |
| 2010/0135865 A1 | | 6/2010 | Constantz et al. |
| 2010/0135882 A1 | | 6/2010 | Constantz et al. |
| 2010/0144521 A1 | | 6/2010 | Constantz et al. |
| 2010/0150802 A1 | | 6/2010 | Gilliam et al. |
| 2010/0154679 A1 | | 6/2010 | Constantz et al. |

(56) References Cited

U.S. PATENT DOCUMENTS

| | | |
|---|---|---|
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0230830 A1 | 9/2010 | Farsad et al. |
| 2010/0236242 A1 | 9/2010 | Farsad et al. |
| 2010/0239467 A1 | 9/2010 | Constantz et al. |
| 2010/0239487 A1 | 9/2010 | Constantz et al. |
| 2010/0258035 A1 | 10/2010 | Constantz et al. |
| 2010/0258506 A1 | 10/2010 | Berkowitz et al. |
| 2010/0276299 A1 | 11/2010 | Kelly et al. |
| 2010/0290967 A1 | 11/2010 | Detournay et al. |
| 2010/0313793 A1 | 12/2010 | Constantz et al. |
| 2010/0313794 A1 | 12/2010 | Constantz et al. |
| 2010/0319586 A1 | 12/2010 | Blount et al. |
| 2011/0030586 A1 | 2/2011 | Constantz et al. |
| 2011/0030957 A1 | 2/2011 | Constantz et al. |
| 2011/0033239 A1 | 2/2011 | Constantz et al. |
| 2011/0035154 A1 | 2/2011 | Kendall et al. |
| 2011/0036728 A1 | 2/2011 | Farsad et al. |
| 2011/0042230 A1 | 2/2011 | Gilliam et al. |
| 2011/0059000 A1 | 3/2011 | Constantz et al. |
| 2011/0071309 A1 | 3/2011 | Constantz et al. |
| 2011/0079515 A1 | 4/2011 | Gilliam et al. |
| 2011/0083968 A1 | 4/2011 | Gilliam et al. |
| 2011/0091366 A1 | 4/2011 | Kendall et al. |
| 2011/0091955 A1 | 4/2011 | Constantz et al. |
| 2011/0132234 A1 | 6/2011 | Constantz et al. |
| 2011/0147227 A1 | 6/2011 | Gilliam et al. |
| 2011/0203489 A1 | 8/2011 | Constantz et al. |
| 2011/0226989 A9 | 9/2011 | Seeker et al. |
| 2011/0240916 A1 | 10/2011 | Constantz et al. |
| 2011/0247336 A9 | 10/2011 | Farsad et al. |
| 2011/0277474 A1 | 11/2011 | Constantz et al. |
| 2011/0277670 A1 | 11/2011 | Self et al. |

FOREIGN PATENT DOCUMENTS

| | | | |
|---|---|---|---|
| EP | 0397189 A2 | 11/1990 | |
| EP | 0487102 B1 | 8/1995 | |
| EP | 0628339 B1 | 9/1999 | |
| EP | 0844905 B1 | 3/2000 | |
| EP | 1016628 A1 | 7/2000 | |
| EP | 1379469 B1 | 3/2006 | |
| EP | 1650162 A1 | 4/2006 | |
| EP | 1716911 A1 | 11/2006 | |
| EP | 1554031 B1 | 12/2006 | |
| EP | 1571105 B1 | 12/2007 | |
| EP | 2253600 A1 | 11/2010 | |
| FR | 2830249 A1 | 4/2003 | |
| GB | 345103 | 3/1931 | |
| GB | 2032441 A | 5/1980 | |
| GB | 2317167 A | 3/1998 | |
| GB | 2418914 A1 | 4/2006 | |
| JP | 7061842 A | 3/1995 | |
| JP | 2000302500 A2 | 10/2000 | |
| WO | WO 99/13967 A1 | 3/1999 | |
| WO | WO 00/34197 A1 | 6/2000 | |
| WO | WO 01/07365 A1 | 2/2001 | |
| WO | WO 03/008071 A1 | 1/2003 | |
| WO | WO 03/054508 A2 | 7/2003 | |
| WO | WO 2005/047571 A2 | 5/2005 | |
| WO | WO 2005/086843 A2 | 9/2005 | |
| WO | WO 2005/108297 A2 | 11/2005 | |
| WO | WO 2006/034339 A1 | 3/2006 | |
| WO | WO 2006/036396 A2 | 4/2006 | |
| WO | WO 2006/038018 A1 | 4/2006 | |
| WO | WO 2006/134080 A1 | 12/2006 | |
| WO | WO 2007/003013 A1 | 1/2007 | |
| WO | WO 2007/016271 A2 | 2/2007 | |
| WO | WO 2007/019612 A1 | 2/2007 | |
| WO | WO 2007/106372 A2 | 9/2007 | |
| WO | WO 2007/123917 A2 | 11/2007 | |
| WO | WO 2008/018928 A2 | 2/2008 | |
| WO | WO 2008/026201 A2 | 3/2008 | |
| WO | WO 2008/061305 A1 | 5/2008 | |
| WO | WO 2008/089523 A1 | 7/2008 | |
| WO | WO 2008/095057 A2 | 8/2008 | |
| WO | WO 2008/101293 A1 | 8/2008 | |
| WO | WO 2008/108657 A1 | 9/2008 | |
| WO | WO 2008/115662 A2 | 9/2008 | |
| WO | WO 2008/124538 A1 | 10/2008 | |
| WO | WO 2008/140821 A2 | 11/2008 | |
| WO | WO 2008/142017 A2 | 11/2008 | |
| WO | WO 2008/142025 A2 | 11/2008 | |
| WO | WO 2008/148055 A1 | 12/2008 | |
| WO | WO 2008/151060 A1 | 12/2008 | |
| WO | WO 2009/006295 A2 | 1/2009 | |
| WO | WO 2009/086460 A1 | 7/2009 | |
| WO | WO 2009/146436 A1 | 12/2009 | |
| WO | WO 2009/155378 A1 | 12/2009 | |
| WO | WO 2010/006242 A1 | 1/2010 | |
| WO | WO 2010/008896 A1 | 1/2010 | |
| WO | WO 2010/009273 A1 | 1/2010 | |
| WO | WO 2010/030826 A1 | 3/2010 | |
| WO | WO 2010/039903 A1 | 4/2010 | |
| WO | WO 2010/039909 A1 | 4/2010 | |
| WO | WO 2010/048457 A1 | 4/2010 | |
| WO | WO 2010/051458 A1 | 5/2010 | |
| WO | WO 2010/068924 A1 | 6/2010 | |
| WO | WO 2010/074686 A1 | 7/2010 | |
| WO | WO 2010/074687 A1 | 7/2010 | |
| WO | WO 2010/087823 A1 | 8/2010 | |
| WO | WO 2010/091029 A1 | 8/2010 | |
| WO | WO 2010/093713 A1 | 8/2010 | |
| WO | WO 2010/093716 A1 | 8/2010 | |
| WO | WO 2010/101953 A1 | 9/2010 | |
| WO | WO 2010/104989 A1 | 9/2010 | |
| WO | WO 2010/132863 A1 | 11/2010 | |
| WO | WO 2010/136744 A1 | 12/2010 | |
| WO | WO 2011/008223 A1 | 1/2011 | |
| WO | WO 2011/017609 A1 | 2/2011 | |
| WO | WO 2011/038076 A1 | 3/2011 | |
| WO | WO 2011/049996 A1 | 4/2011 | |
| WO | WO 2011/066293 A1 | 6/2011 | |
| WO | WO 2011/075680 A1 | 6/2011 | |
| WO | WO 2011/081681 A1 | 7/2011 | |
| WO | WO 2011/097468 A2 | 8/2011 | |
| WO | WO 2011/102868 A1 | 8/2011 | |

OTHER PUBLICATIONS

International search report and written opinion dated Aug. 21, 2008 for PCT/US2008/064783.

Monteiro, et al. Incorporating carbon sequestration materials in civil infrastructure: A micro and nano-structural analysis. Cement and Concrete Composites. 2013; 40:14-20.

Constantz, B. (2009) "The Risk of Implementing New Regulations on Game-Changing Technology: Sequestering CO2 in the Built Environment" AGU, 90(22), Jt. Assem, Suppl., Abstract.

Metz et al. 2005. IPCC Special Report on Carbon Dioxide Capture and Storage. Chapter 7: Mineral carbonation and industrial uses of carbon dioxide. England: Cambridge University Press. pp. 320-337.

Rautaray, D. et al. 2005. Biological Synthesis of Stable Vaterite Crystals by the Reaction of Calcium Ions with Germinating Chickpea Seeds. *American Chemical Society. Crystal Growth & Design.* 5(2): 399-402.

Raz, S. et al. 2002. Stable Amorphous Calcium Carbonate is the Main Component of the Calcium Storage Structures of the Crustacean Orchestia Cavimana. *Biol. Bull.* 203: 269-274.

Reddy et al. 1976. The Crystallization of Calcium Carbonate. *Journal of Crystal Growth.* 35: 33-38.

U.S. Appl. No. 12/126,776, filed May 23, 2008, Constantz, Brent R., et al, Notice of Allowance dated May 6, 2010.

U.S. Appl. No. 12/700,076, filed Feb. 4, 2010, Constantz, Brent R., et al, Final Office Action dated Dec. 21, 2010.

U.S. Appl. No. 12/700,076, filed Feb. 4, 2010, Constantz, Brent R., et al, Notice of Allowance dated Jan. 25, 2011.

(56) References Cited

OTHER PUBLICATIONS

Aker, "Aker Clean Carbon, Carbon Capture Solutions Provider" Aker Clean Carbon Presentation for UN's IPCC; Jan. 24, 2008; 8pp.

Akili, W. Pile Driving in Coral Deposits: a Case Study along the Red Sea. Orlando 2002: The International Deep Foundations Congress. Feb. 13-16, 2002. Orlando, Florida. pp. 604-618.

Alexander, G. et al., "Evaluation of reaction variables in the dissolution of serpentine for mineral carbonation"; Elsevier; ScienceDirect Fuel 86 (2007) 273-281.

Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.

Bradshaw, V. World War II Vet Recalls Service: High school senior drafted two months after 18 birthday. *The Shawnee News-Star, Shawnee, OK.* Apr. 28, 2009. http://www.news-star.com/homepage/x297242254/World-War-II-vet-recalls-service. 3 pages. (accesse.

CICCS "Aims and Research"; www.nottingham.ac.uk/carbonmanagement/ccs_aims.php 2pp Aug. 3, 2007.

Combes, C., et al. 2006. Calcium carbonate-calcium phosphate mixed cement compositions for bone reconstruction. *Wiley Periodicals, Inc.* 79A: 318-328.

Combes C., et al. 2006. Preparation, physical-chemical characterisation and cytocompatibility of calcium carbonate cements. *Biomaterials.* 27: 1945-1954.

Druckenmiller et al., "Carbon sequestration using brine of adjusted pH to form mineral carbonates"; Elsevier; www.elsevier.com/locate/fuproc; Fuel Processing Technology 86 (2005) 1599-1614.

Goldberg et al., "CO2 Mineral Sequestration Studies in US"; National Energy Technology Laboratory; goldberg@netl.doe.gov; 10pp, date unavailable.

Graff "Just Catch—CO2 Capture Technology" Aker Kvaerner; Pareto Clean Energy Tech Seminar Oct. 11, 2007 25pp.

Green Car Congress "PKU Researchers Carry Out Aqueous Fischer-Tropsch Reaction for First Time"; www.greeencarcongress.com/2007/12/pku-researchers.html; Dec. 12, 2007; 2pp.

Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.

Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.

Haywood et al., "Carbon dioxide sequestration as stable carbonate minerals—environmental barriers"; Environmental Geology (2001) 41:11-16; Springer-Verlag 2001.

Hilbertz, "Solar-generated construction material from sea water to mitigate global warming"; Building Research and Information. 1991 19(4): 242-55.

Hill et al., "Preliminary Investigation of Carbon Sequestration Potential in Brine from Pennsylvania's Oriskany Sandstone Formation in Indiana County, PA"; The Energy Institute and the Department of Energy & Geo-Environmental Engineering; 5pp, undated.

International Search Report dated Mar. 17, 2010 of EP2134664.

Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.

Lackner, K. "Carbonate Chemistry for Sequestering Fossil Carbon"; Annual Review Energy Environ. 2002 27:193-232.

Larson, G.W. Online Veterans Tribute: World War II Experiences Seabees, Pearl Harbor, [online]. http://www.americanveteranscenter.org/trib_Larson.html. 4 pages. (accessed Aug. 24, 2009).

Lay, M.G. 1998. Handbook of Road Technology, vol. 1: Planning and Pavements. Third Edition. Section 8.5.5 Organic Rocks, p. 187. Amsterdam: Gordon and Breach Science Publishers.

O'Connor et al. 2001. "Carbon Dioxide Sequestration by Direct Mineral Carbonation: Results From Recent Studies and Current Status"; Albany Research Center, Albany Oregon; Office of Fossil Energy, US Dept. of Energy; 1st Annual DOE Carbon Sequestration Conferen.

Raz et al., "Formation of High-Magnesium Calcites via an Amorphous Precursor Phase: Possible Biological Implications"; Advanced Materials; Adv. Mater. (2000) vol. 12, No. 1; 5pp.

Rollings, M.P. et al. 2005. Geology: Engineer Ignore It at Your Peril. *Journal of Geotechnical and Geoenvironmental Engineering.* 131(6): 783-791.

Rosenthal, E., "Cement Industry is at Center of Climate Change Debate" New York Times; www.nytimes.com/2007/10/26/business/worldbusiness/26cement.html ref=todayspaper; 4pp.

Rottman, G.L. 2002. World War II Pacific Island Guide: A Geo-Military Study. Part 1: Geo-Military Aspects of the Pacific Theater, The Islands: Geo-Military Aspects, p. 9. Westport, CT: Greenwood Press.

Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 (2003) pp. 653-663.

Shell Global Solutions, 2003. "ADIP-X and Sulfinol-X—new regenerable acid-gas removal processes"; Shell Global Solutions International; OG 130210370903-En(A); www.shellglobalsoultions.com 2 pp (presented at the 12th International Oil, Gas, and Petrochemicals Congress, Tehran, Iran Feb. 24-26, 2003).

Tececo Pty Ltd, "Eco-Cement"; www.tececo.com/simple.eco-cement.php; Dec. 29, 2008; 6pp.

U.S. Appl. No. 12/126,776, filed May 23, 2008, Constantz, Brent R., et al, Non-Final Office Action dated Feb. 25, 2010; 21 pp.

U.S. Appl. No. 12/126,776, filed May 23, 2008, Constantz, Brent R., et al, Non-Final Office Action dated Mar. 22, 2010.

U.S. Appl. No. 12/700,076, filed Feb. 4, 2010, Constantz, Brent R., et al, Non-Final Office Action dated Nov. 8, 2010.

U.S. Appl. No. 12/163,205, filed Jun. 27, 2008, Constantz, Brent R., et al, Non-Final Office Action dated Jan. 27, 2010.

U.S. Appl. No. 12/163,205, filed Jun. 27, 2008, Constantz, Brent R., et al, Non-Final Office Action dated Mar. 1, 2010.

U.S. Appl. No. 12/475,378, filed May 29, 2009, Constantz Brent. et al, Non-Final Office Action dated Mar. 2, 2010.

U.S. Appl. No. 12/486,692, filed Jun. 17, 2009, Constantz Brent. et al, Non-Final Office Action dated Mar. 1, 2010.

Wen-Zhi et al., "Using Electrolytic Method to Promote CO2 Sequestration in Serpentine by Mineral Carbonation"; Journal of China University of Mining and Technology; vol. 36, No. 6; Nov. (2007) (Publication and English Translation).

Zimmerman, J.C. 2008. The Construction of Airfields during the New Georgia Campaign of 1943-44: Lessons Learned by the United States Naval Construction Battalions. Johnson City, TN: East Tennessee State University.

\* cited by examiner

P00099_0004
P00099-002

P00099_0003
P00099-002

US 8,857,118 B2

HYDRAULIC CEMENTS COMPRISING CARBONATE COMPOUND COMPOSITIONS

CROSS-REFERENCE TO RELATED APPLICATIONS

This application is a continuation of U.S. patent application Ser. No. 12/700,076, filed Feb. 4, 2010, which is a continuation of U.S. Pat. No. 7,735,274, filed May 23, 2008, which pursuant to 35 U.S.C. §119 (e), claims priority to U.S. Provisional Patent Application Ser. No. 60/931,657 filed on May 24, 2007; U.S. Provisional Patent Application Ser. No. 60/937,786 filed on Jun. 28, 2007; U.S. Provisional Patent Application 61/017,419 filed on Dec. 28, 2007 and U.S. Provisional Patent Application Ser. No. 61/017,371 filed on Dec. 28, 2007, the disclosures of which applications are herein incorporated by reference.

INTRODUCTION

Concrete is the most widely used engineering material in the world. It is estimated that the present world consumption of concrete is 11 billion metric tons per year. (Concrete, Microstructure, Properties and Materials (2006, McGraw-Hill)). Concrete is a term that refers to a composite material of a binding medium having particles or fragments of aggregate embedded therein. In most construction concretes currently employed, the binding medium is formed from a mixture of a hydraulic cement and water.

Hydraulic cements are compositions which set and harden after combining with water. After hardening, the compositions retain strength and stability even under water. The key requirement for this characteristic is that the hydrates formed from the cement constituents upon reaction with water are essentially insoluble in water. Cements may be employed by themselves or in combination with aggregates, both coarse and fine, in which case the compositions may be referred to as concretes or mortars.

Setting and hardening of hydraulic cements is caused by the formation of water-containing compounds, forming as a result of reactions between cement components and water. The reaction and the reaction products are referred to as hydration and hydrates or hydrate phases, respectively. As a result of the immediately starting reactions, a stiffening can be observed which is very small in the beginning, but which increases with time. After reaching a certain level, this point in time is referred to as the start of setting. The consecutive further consolidation is called setting, after which the phase of hardening begins. The compressive strength of the material then grows steadily, over a period which ranges from a few days in the case of "ultra-rapid-hardening" cements, to several years in the case of ordinary cements.

Most hydraulic cements employed today are based upon Portland cement. Portland cement is made primarily from limestone, certain clay minerals, and gypsum, in a high temperature process that drives off carbon dioxide and chemically combines the primary ingredients into new compounds. The energy required to fire the mixture consumes about 4 GJ per ton of cement produced.

Because carbon dioxide is generated by both the cement production process itself, as well as by energy plants that generate power to run the production process, cement production is currently a leading source of current carbon dioxide atmospheric emissions. It is estimated that cement plants account for 5% of global emissions of carbon dioxide. As global warming and ocean acidification become an increasing problem and the desire to reduce carbon dioxide gas emissions (a principal cause of global warming) continues, the cement production industry will fall under increased scrutiny.

In addition to the pollution problems associated with Portland cement production, the durability of structures produced with Portland cements is a major repair and maintenance expense, mainly because of the instability of the cured product produced from Portland cement.

SUMMARY

Hydraulic cement compositions that include a carbonate compound composition, e.g., a salt-water derived carbonate compound composition containing crystalline and/or amorphous carbonate compounds, are provided. Also provided are methods of making and using the hydraulic cements, as well as settable compositions, such as concretes and mortars, prepared therefrom. The cements and compositions produced therefrom find use in a variety of applications, including use in a variety of building materials and building applications.

DETAILED DESCRIPTION

Figure 1:
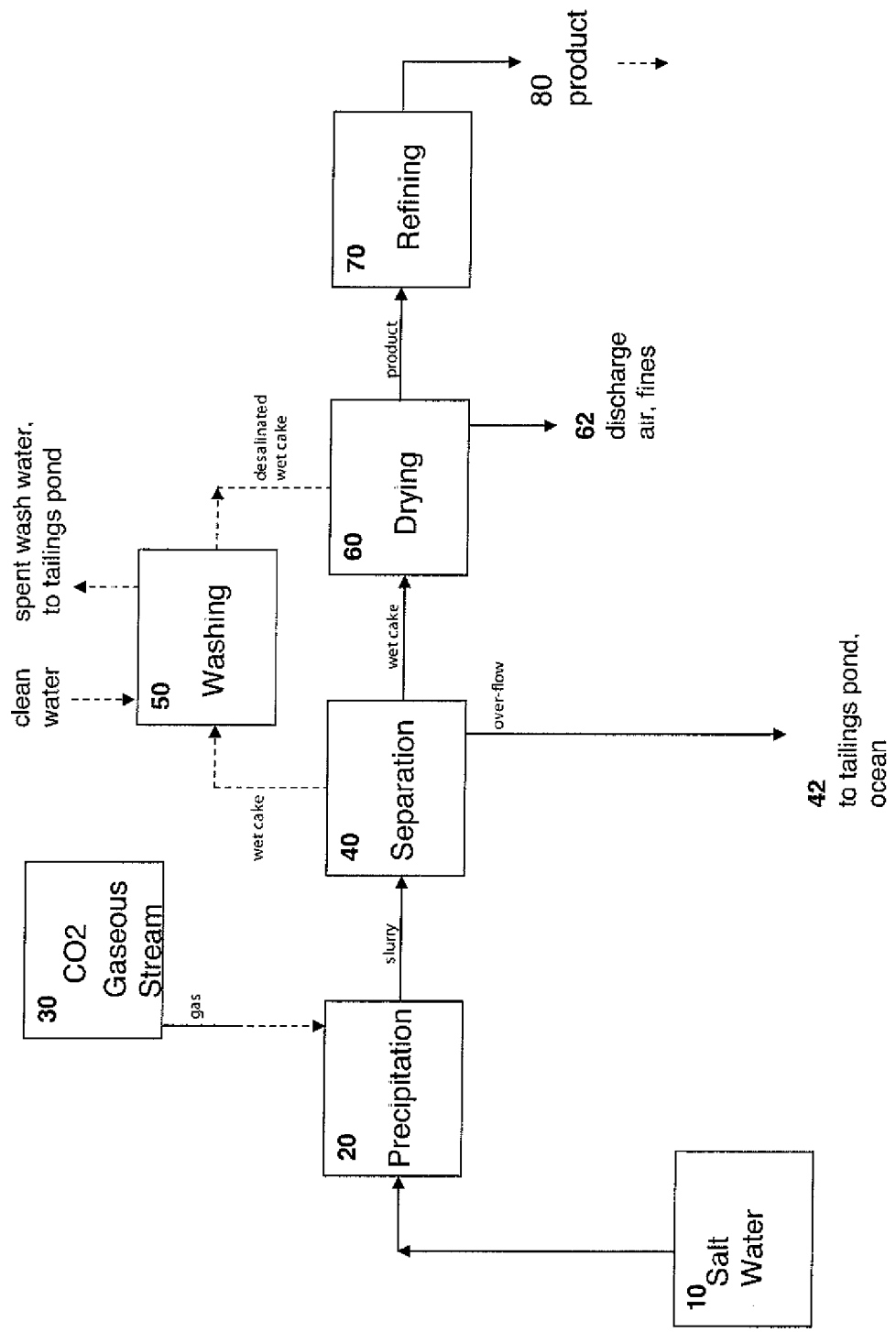
FIG. 1 provides a flow diagram of a precipitation process according to an embodiment of the invention.

Hydraulic cement compositions that include a carbonate compound composition, e.g., a salt-water derived carbonate compound composition containing crystalline and/or amorphous carbonate compounds, are provided. Also provided are methods of making and using the hydraulic cements, as well as settable compositions, such as concretes and mortars, prepared therefrom. The cements and compositions produced therefrom find use in a variety of applications, including use in a variety of building materials and building applications.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

In further describing the subject invention, the hydraulic cement compositions, as well as methods and systems for their production, will be described first in greater detail. Next, concretes prepared from the hydraulic cements of the invention, as well as methods of using the same, will be reviewed further.

Hydraulic Cement Comprising Carbonate Precipitate Component

Aspects of the invention include hydraulic cements. The term "hydraulic cement" is employed in its conventional sense to refer to a composition which sets and hardens after combining with water or a solution where the solvent is water, e.g., an admixture solution. Setting and hardening of the product produced by combination of the cements of the invention with an aqueous liquid results from the production of hydrates that are formed from the cement upon reaction with water, where the hydrates are essentially insoluble in water.

The hydraulic cement compositions are dry particulate compositions, e.g., powders. In certain embodiments, the dry particulate compositions are made up of particles having an average particle size ranging from 0.1 to 100 microns, such as 10 to 40 microns as determined using any convenient particle size determination protocol, such as Multi-detector laser scattering or sieving (i.e. <38 microns). In certain embodiments, multimodal, e.g., bimodal or other, distributions are present. Bimodal distributions allow the surface area to be minimized, thus allowing a lower liquids/solids mass ration for the cement yet providing smaller reactive particles for early reaction. In these instances, the average particle size of the larger size class can be upwards of 1000 microns (1 mm). The surface area of the components making up the cement may vary. A given cement may have an average surface area sufficient to provide for a liquids to solids ratio upon combination with a liquid to produce a settable composition (e.g., as described in greater detail below) ranging from 0.5 $m^2$/gm to 50 $m^2$/gm, such as 0.75 to 20 $m^2$/gm and including 0.80 to 10 $m^2$/gm. In certain embodiments, the surface area of the cement ranges from 0.9 to 5 $m^2$/gm, such as 0.95 to 2 $m^2$/gm and including 1 to 2 $m^2$/gm, as determined using the surface area determination protocol described in Breunner, Emmit and Teller 1953.

Hydraulic cements of the invention include a carbonate compound composition. The carbonate compound compositions of the cements are metastable carbonate compounds that are precipitated from a water, such as an alkaline-earth-metal-containing water, e.g., a salt-water, as described in greater detail below. The carbonate compound compositions of the invention included precipitated crystalline and/or amorphous carbonate compounds.

The water employed in the invention is an alkaline-earth-metal-containing water. Accordingly, the water employed in the process is one that includes one or more alkaline earth metals, e.g., magnesium, calcium, etc. Waters of interest include those that include calcium in amounts ranging from 50 to 20,000 ppm, such as 100 to 10,0000 ppm and including 200 to 5000 ppm. Waters of interest include those that include magnesium in amounts ranging from 50 to 20,000 ppm, such as 200 to 10000 ppm and including 500 to 5000 ppm.

In certain embodiments, the water from which the carbonate compound composition is precipitated is a saltwater. In such embodiments, the carbonate compound composition may be viewed as a saltwater derived carbonate compound composition. As used herein, "saltwater-derived carbonate compound composition" means a composition derived from saltwater and made up of one or more different carbonate crystalline and/or amorphous compounds with or without one or more hydroxide crystalline or amorphous compounds. The term "saltwater" is employed in its conventional sense to refer to a number of different types of aqueous liquids other than fresh water, where the term "saltwater" includes brackish water, sea water and brine (including man-made brines, e.g., geothermal plant wastewaters, desalination waste waters, etc), as well as other salines having a salinity that is greater than that of freshwater. Brine is water saturated or nearly saturated with salt and has a salinity that is 50 ppt (parts per thousand) or greater. Brackish water is water that is saltier than fresh water, but not as salty as seawater, having a salinity ranging from 0.5 to 35 ppt. Seawater is water from a sea or ocean and has a salinity ranging from 35 to 50 ppt. The saltwater source from which the mineral composition of the cements of the invention is derived may be a naturally occurring source, such as a sea, ocean, lake, swamp, estuary, lagoon, etc., or a man-made source. In certain embodiments, the saltwater source of the mineral composition is seawater.

While the present invention is described primarily in terms of saltwater sources, in certain embodiments, the water employed in the invention may be a mineral rich, e.g., calcium and/or magnesium rich, freshwater source.

The saltwater-derived mineral compositions of embodiments of embodiments of the cements are ones that are derived from a saltwater. As such, they are compositions that are obtained from a saltwater in some manner, e.g., by treating a volume of a saltwater in a manner sufficient to produce the desired carbonate compound composition from the initial volume of saltwater. In certain embodiments, the saltwater-derived carbonate compound compositions of the cements are derived from saltwater by precipitating them from the saltwater. In certain embodiments, the carbonate compound compositions are separated in solid form from a saltwater, as by means of a reagent, such as developed in greater detail below.

The compounds of the hydraulic cements of the invention are ones which include carbonate compounds and/or hydroxide compounds that, upon combination with fresh water, dissolve and produce different compounds that are more stable in fresh water than compounds of the saltwater-derived carbonate compound composition. The compounds of the carbonate compositions may be ones that are more stable in salt water than they are in freshwater, such that they may be viewed as saltwater metastable compounds.

The saltwater-derived carbonate compound compositions may include one or more different carbonate compounds, such as two or more different carbonate compounds, e.g., three or more different carbonate compounds, five or more different carbonate compounds, etc., and may further include one or more, such as two or more, e.g., three or more, different hydroxide compounds. The particular compound profile, i.e., the identity of the different types of different carbonate and/or hydroxide compounds and the amounts of each, in a given carbonate compound composition may vary and will be dependent on the particular nature of the water from which it is derived, as well as the particular conditions employed to derive it.

As indicated above, the compounds of the carbonate compound compositions are metastable carbonate compounds (and may include one or more metastable hydroxide compounds) that are more stable in saltwater than in freshwater, such that upon contact with fresh water of any pH they dissolve and re-precipitate into other fresh water stable compounds, e.g., minerals. The carbonate compounds may be amorphous or crystalline. In certain embodiments, the carbonate compounds are present as small particles, e.g., with crystal sizes ranging from 0.1 microns to 100 microns, such as 0.5 to 10 microns, as determined by Scanning electron microscopy. In certain embodiments, the crystals have a high surface area, e.g., ranging from 0.5 to 50 $m^2$ sq./gm, such as from 0.5 to 2.0 $m^2$/gm, as determined by Brauner, Emmit, & Teller (BET) Surface Area Analysis.

The carbonate and hydroxide compounds of the cements may include a number of different cations, such as but not limited to: calcium, magnesium, sodium, potassium, sulfur, boron, silicon, strontium, and combinations thereof, where specific carbonate minerals of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3.6H_2O$), and amorphous calcium carbonate ($CaCO_3.nH_2O$). Magnesium carbonate minerals of interest include, but are not limited to: magnesite ($MgCO_3$), barringtonite ($MgCO_3.2H_2O$), nesquehonite ($MgCO_3.3H_2O$), lanfordite ($MgCO_3.5H_2O$) and amorphous magnesium calcium carbonate ($MgCO_3.nH_2O$). Calcium magnesium carbonate minerals of interest include, but are not limited to dolomite ($CaMgCO_3$), huntitte ($CaMg(CO_3)_4$) and sergeevite ($Ca_2Mg_{11}(CO_3)_{13}.H_2O$). The principal calcium hydroxide mineral of interest is portlandite ($Ca(OH)_2$), and amorphous hydrated analogs thereof. The principal magnesium hydroxide mineral of interest is brucite ($Mg(OH)_2$), and amorphous hydrated analogs thereof.

As the carbonate compound compositions of embodiments of the invention are derived from a salt water source, they will include one or more components that are present in the salt water source and identify the compound compositions that come from the salt water source, where these identifying components and the amounts thereof are collectively referred to herein as a saltwater source identifier. For example, if the saltwater source is sea water, identifying that may be present in the carbonate and hydroxide mineral composition include, but are not limited to: chloride, sodium, sulfur, potassium, bromide, silicon, strontium and the like. Any such source-identifying or "marker" elements are generally present in small amounts, e.g., in amounts of 20,000 ppm or less, such as amounts of 2000 ppm or less. In certain embodiments, the "marker" compound is strontium, which may be present in the precipitated incorporated into the aragonite lattice, and make up 10,000 ppm or less, ranging in certain embodiments from 3 to 10,000 ppm, such as from 5 to 5000 ppm, including 5 to 1000 ppm, e.g., 5 to 500 ppm, including 5 to 100 ppm. Another "marker" compound of interest is magnesium, which may be present in amounts of up to 20% mole substitution for calcium in carbonate compounds. The saltwater source identifier of the compositions may vary depending on the particular saltwater source employed to produce the saltwater-derived carbonate composition. In certain embodiments, the calcium carbonate content of the cement is 25% w/w or higher, such as 40% w/w or higher, and including 50% w/w or higher, e.g., 60% w/w. The carbonate compound composition has, in certain embodiments, a calcium/magnesium ratio that is influenced by, and therefore reflects, the water source from which it has been precipitated. In certain embodiments, the calcium/magnesium molar ratio ranges from 10/1 to 1/5 Ca/Mg, such as 5/1 to 1/3 Ca/Mg. In certain embodiments, the carbonate composition is characterized by having an water source identifying carbonate to hydroxide compound ratio, where in certain embodiments this ratio ranges from 100 to 1, such as 10 to 1 and including 1 to 1.

The proportion of the cement that is the precipitated carbonate compound composition may vary. In certain embodiments, the cement includes from 5 to 50% w/w, such as 5 to 25% w/w including 5 to 10% w/w of carbonate compound composition. In certain embodiments, the carbonate compound composition makes up greater than 50% of the cement. In certain embodiments, the cement includes from 25 to 80% w/w, such as 50 to 75% w/w including 75 to 80% w/w of carbonate compound composition. In certain embodiments, the carbonate compound composition makes up greater than 80% w/w or more of the cement, e.g., 90% w/w or more of the cement. The cement may be entirely made up of the saltwater derived carbonate compound composition, or include one or more additional components.

In certain embodiments, the cements are blends, in that they include not only the carbonate compound composition component but also one or more additional components that are added to modify the properties of the cement, e.g., to provide desired strength attainment, to provide desired setting times, etc. Components of interest that may be present in blended cements of the invention include, but are not limited to: blast furnace slag, fly ash, diatomaceous earth, and other natural or artificial pozzolans, silica fumes, limestone, gypsum, hydrated lime, air entrainers, retarders, waterproofers and coloring agents. The amount of such components present in a given blended cement of the invention may vary, and in certain embodiments the amounts of these components range from 1 to 50% w/w, such as 2 to 10% w/w.

Of interest in certain embodiments are Portland cement blends. The phrase "Portland cement blend" refers to a hydraulic cement composition that includes a Portland cement component and significant amount of a non-Portland cement component. As the cements of the invention are Portland cement blends, the cements include a Portland cement component. The Portland cement component may be any convenient Portland cement. As is known in the art, Portland cements are powder compositions produced by grinding Portland cement clinker (more than 90%), a limited amount of calcium sulfate which controls the set time, and up to 5% minor constituents (as allowed by various standards). As defined by the European Standard EN197.1, "Portland cement clinker is a hydraulic material which shall consist of at least two-thirds by mass of calcium silicates ($3CaO.SiO_2$ and $2CaO.SiO_2$), the remainder consisting of aluminium- and iron-containing clinker phases and other compounds. The ratio of CaO to $SiO_2$ shall not be less than 2.0. The magnesium content (MgO) shall not exceed 5.0% by mass." In certain embodiments, the Portland cement constituent of the present invention is any Portland cement that satisfies the ASTM Standards and Specifications of C150 (Types I-VIII) of the American Society for Testing of Materials (ASTM C50-Standard Specification for Portland Cement). ASTM C150 covers eight types of portland cement, each possessing different properties, and used specifically for those properties.

In a given Portland cement blend composition of the invention, the amount of Portland cement component may vary. In certain embodiments, the amount of Portland cement in the blend ranges from 10 to 90% (w/w), such as 30 to 70% (w/w) and including 40 to 60% (w/w), e.g., a blend of 80% OPC and 20% carbonate compound cement of the invention.

In certain embodiments, the cements further include a pH regulating agent which influences the pH of the fluid component of settable composition produced from the cement (e.g., a mortar or concrete) upon combination of the cement with water. Of interest are agents that provide for an alkaline environment upon combination with water, e.g., where the pH of the hydrated cement is 12 or higher, such as 13 or higher, and including 13.5 or higher. In certain embodiments, the pH regulating (i.e., modulating) agent is an oxide or hydroxide, e.g., calcium oxide, calcium hydroxide, magnesium oxide or magnesium hydroxide. When present, such agents may be present in amounts ranging from 1 to 10% w/w, such as 2 to 5% w/w.

In certain embodiments, the cement includes an amount of aggregate. Aggregate can be included in the cementitious composition to provide for mortars which include fine aggregate, and concretes which also include coarse aggregate. The fine aggregates are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed round marble, glass spheres, granite, limestone, calcite, feldspar, alluvial sands, sands or any other durable aggregate, and mixtures thereof. As such, the term "aggregate" is used broadly to refer to a number of different types of both coarse and fine particulate material, including but not limited to: sand, gravel, crushed stone, slag, and recycled concrete. The amount and nature of the aggregate may vary widely. In certain embodiments, the amount of aggregate may range from 25 to 80%, such as 40 to 70% and including 50 to 70 w/w of the total composition made up of both the cement component and the aggregate.

Specific hydraulic cement formulations of interest are described in greater detail in the Experimental Section, below.

Production of Saltwater-Derived Mineral Component

As reviewed above, the hydraulic cements are cements that include a carbonate compound composition, such as a saltwater-derived carbonate compound composition. As such, the carbonate compound composition of the cements is one that is made up of one or more different carbonate compounds, which may be amorphous or crystalline. As reviewed above, the carbonate compound compositions of the cements may include one or more hydroxide compounds.

As reviewed above, the carbonate compounds compositions are produced by precipitation from an alkaline-earth-metal-containing water, e.g., a saltwater. The saltwater employed in methods may vary. As reviewed above, saltwaters of interest include brackish water, sea water and brine, as well as other salines having a salinity that is greater than that of freshwater (which has a salinity of less than 5 ppt dissolved salts).

In methods of producing the carbonate compound compositions of the cements of the invention, a volume of water is subjected to carbonate compound precipitation conditions sufficient to produce a precipitated carbonate compound composition and a mother liquor (i.e., the part of the water that is left over after precipitation of the carbonate compound(s) from the saltwater). Any convenient precipitation conditions may be employed, which conditions result in the production of a carbonate compound composition.

Precipitation conditions of interest may vary. For example, the temperature of the water may be within a suitable range for the precipitation of the desired mineral to occur. In some embodiments, the temperature of the water may be in a range from 5 to 70° C., such as from 20 to 50° C. and including from 25 to 45° C. As such, while a given set of precipitation conditions may have a temperature ranging from 0 to 100° C., the temperature of the water may have to be adjusted in certain embodiments to produce the desired precipitate.

In normal sea water 93% of the dissolved $CO_2$ is in the form of bicarbonate ions ($HCO_3^-$) and 6% is in the form of carbonate ions ($CO_3^{-2}$). When calcium carbonate precipitates from normal sea water, $CO_2$ is released. Above pH 10.33, greater than 90% of the carbonate is in the form of carbonate ion, and no $CO_2$ is released during the precipitation of calcium carbonate. While the pH of the water employed in methods may range from 5 to 14 during a given precipitation process, in certain embodiments the pH is raised to alkaline levels in order to drive the precipitation of carbonate compounds, as well as other compounds, e.g., hydroxide compounds, as desired. In certain of these embodiments, the pH is raised to a level which minimizes if not eliminates $CO_2$ production during precipitation, causing dissolved $CO_2$, e.g., in the form of carbonate and bicarbonate, to be trapped in the carbonate compound precipitate. In these embodiments, the pH may be raised to 10 or higher, such as 11 or higher.

The pH of the water may be raised using any convenient approach. In certain embodiments, a pH raising agent may be employed, where examples of such agents include oxides, hydroxides (e.g., potassium hydroxide, sodium hydroxide, brucite ($Mg(OH)_2$), etc.), carbonates (e.g. sodium carbonate) and the like. One such approach would be to use the coal ash from a coal-fired power plant, which contains many oxides, to elevate the pH of sea water. Other coal processes, like the gasification of coal, to produce syngas, also produce hydrogen gas and carbon monoxide, and may serve as a source of hydroxide as well, Some naturally occurring minerals, such as serpentine, contain hydroxide, and can be dissolved, yielding a hydroxide source. The amount of pH elevating agent that is added to the water will depend on the particular nature of the agent and the volume of saltwater being modified, and will be sufficient to raise the pH of the water to the desired value. Alternatively, the pH of the saltwater source can be raised to the desired level by electrolysis of the water. Where electrolysis is employed, a variety of different protocols may be taken, such as use of the Mercury cell process (also called the Castner-Kellner process); the Diaphragm cell process and the membrane cell process. Where desired, byproducts of the hydrolysis product, e.g., $H_2$, sodium metal, etc. may be harvested and employed for other purposes, as desired.

Additives other than pH elevating agents may also be introduced into the water in order to influence the nature of the precipitate that is produced. As such, certain embodiments of the methods include providing an additive in water before or during the time when the water is subjected to the precipitation conditions. Certain calcium carbonate polymorphs can be favored by trace amounts of certain additives. For example, vaterite, a highly unstable polymorph of $CaCO_3$ which precipitates in a variety of different morphologies and converts rapidly to calcite, can be obtained at very high yields by including trace amounts of lanthanum as lanthanum chloride in a supersaturated solution of calcium carbonate. Other additives beside lathanum that are of interest include, but are not limited to transition metals and the like. For instance, iron is known to favor the formation of disordered dolomite (protodolomite) where it would not form otherwise.

The nature of the precipitate can also be influenced by selection of appropriate major ion ratios. Major ion ratios also have considerable influence of polymorph formation. For example, as the magnesium:calcium ratio in the water increases, aragonite becomes the favored polymorph of calcium carbonate over low-magnesium calcite. At low magnesium:calcium ratios, low-magnesium calcite is the preferred polymorph.

Rate of precipitation also impacts compound phase formation and may be controlled in a manner sufficient to produce a desired precipitate product. The most rapid precipitation can be achieved by seeding the solution with a desired phase. Without seeding, rapid precipitation can be achieved by rapidly increasing the pH of the sea water, which results in more amorphous constituents. The higher the pH is, the more rapid the precipitation is and the more amorphous the precipitate is.

Accordingly, a set of precipitation conditions to produce a desired precipitate from a water include, in certain embodiments, the water's temperature and pH, and in some instances the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate compound precipitates according to the invention may be batch or continuous protocols. It will be appreciated that precipitation conditions may be different to produce a given precipitate in a continuous flow system compared to a batch system.

In certain embodiments, the methods further include contacting the volume of water that is subjected to the mineral precipitation conditions with a source of $CO_2$. Contact of the water with the source $CO_2$ may occur before and/or during the time when the water is subject to $CO_2$ precipitation conditions. Accordingly, embodiments of the invention include methods in which the volume of water is contacted with a source of $CO_2$ prior to subjecting the volume of saltwater to mineral precipitation conditions. Embodiments of the invention include methods in which the volume of salt water is contacted with a source of $CO_2$ while the volume of saltwater is being subjected to mineral precipitation conditions. Embodiments of the invention include methods in which the volume of water is contacted with a source of a $CO_2$ both prior to subjecting the volume of water to mineral precipitation conditions and while the volume of water is being subjected to carbonate compound precipitation conditions.

The source of $CO_2$ that is contacted with the volume of water in these embodiments may be any convenient $CO_2$ source. The $CO_2$ source may be a liquid, solid (e.g., dry ice) or gaseous $CO_2$ source. In certain embodiments, the $CO_2$ source is a gaseous $CO_2$ source. This gaseous $CO_2$ is, in certain instances, a waste stream or product from an industrial plant. The nature of the industrial plant may vary in these embodiments, where industrial plants of interest include power plants, chemical processing plants, and other industrial plants that produce $CO_2$ as a byproduct. By waste stream is meant a stream of gas (or analogous stream) that is produced as a byproduct of an active process of the industrial plant. The gaseous stream may be substantially pure $CO_2$ or a multicomponent gaseous stream that includes $CO_2$ and one or more additional gases. Multicomponent gaseous streams (containing $CO_2$) that may be employed as a $CO_2$ source in embodiments of the subject methods include both reducing, e.g., syngas, shifted syngas, natural gas, and hydrogen and the like, and oxidizing condition streams, e.g., flue gases from combustion. Particular multicomponent gaseous streams of interest that may be treated according to the subject invention include: oxygen containing combustion power plant flue gas, turbo charged boiler product gas, coal gasification product gas, shifted coal gasification product gas, anaerobic digester product gas, wellhead natural gas stream, reformed natural gas or methane hydrates, and the like.

The volume of water may be contacted with the $CO_2$ source using any convenient protocol. Where the $CO_2$ is a gas, contact protocols of interest include, but are not limited to: direct contacting protocols, e.g., bubbling the gas through the volume of saltwater, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient.

Following production of the carbonate compound precipitate from the water, the resultant precipitated carbonate compound composition is separated from the mother liquor to produce separated carbonate compound precipitate product. Separation of the precipitate can be achieved using any convenient approach, including a mechanical approach, e.g., where bulk excess water is drained from the precipitated, e.g., either by gravity alone or with the addition of vacuum, mechanical pressing, by filtering the precipitate from the mother liquor to produce a filtrate, etc. Separation of bulk water produces a wet, dewatered precipitate.

The resultant dewatered precipitate is then dried to produce a product. Drying can be achieved by air drying the filtrate. Where the filtrate is air dried, air drying may be at a temperature ranging from −70 to 120° C., as desired. In certain embodiments, drying is achieved by freeze-drying (i.e., lyophilization), where the precipitate is frozen, the surrounding pressure is reduced and enough heat is added to allow the frozen water in the material to sublime directly from the frozen precipitate phase to gas. In yet another embodiment, the precipitate is spray dried to dry the precipitate, where the liquid containing the precipitate is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc.

Where desired, the precipitate may be stored in the mother liquor for a period of time following precipitation and prior to separation, e.g., by drying. For example, the precipitate may be stored in the mother liquor for a period of time ranging from 1 to 1000 days or longer, such as 1 to 10 days or longer, at a temperature ranging from 1 to 40° C., such as 20 to 25° C.

FIG. 1 provides a schematic flow diagram of a carbonate precipitation process according to an embodiment of the invention. In FIG. 1, saltwater from salt water source 10 is subjected to carbonate compound precipitation conditions at precipitation step 20. As reviewed above, term "saltwater" is employed in its conventional sense to refer a number of different types of aqueous fluids other than fresh water, where the term "saltwater" includes brackish water, sea water and brine (including man-made brines, e.g., geothermal plant wastewaters, desalination waste waters, etc), as well as other salines having a salinity that is greater than that of freshwater. The saltwater source from which the carbonate compound composition of the cements of the invention is derived may be a naturally occurring source, such as a sea, ocean, lake, swamp, estuary, lagoon, etc., or a man-made source.

In certain embodiments, the water may be obtained from the power plant that is also providing the gaseous waste stream. For example, in water cooled power plants, such as seawater cooled power plants, water that has been employed by the power plant may then be sent to the precipitation system and employed as the water in the precipitation reaction. In certain of these embodiments, the water may be cooled prior to entering the precipitation reactor.

In the embodiment depicted in FIG. 1, the water from saltwater source 10 is first charged with $CO_2$ to produce $CO_2$ charged water, which $CO_2$ is then subjected to carbonate compound precipitation conditions. As depicted in FIG. 1, a $CO_2$ gaseous stream 30 is contacted with the water at precipitation step 20. The provided gaseous stream 30 is contacted with a suitable water at precipitation step 20 to produce a $CO_2$ charged water. By $CO_2$ charged water is meant water that has had $CO_2$ gas contacted with it, where $CO_2$ molecules have combined with water molecules to produce, e.g., carbonic acid, bicarbonate and carbonate ion. Charging water in this step results in an increase in the "$CO_2$ content" of the water, e.g., in the form of carbonic acid, bicarbonate and carbonate ion, and a concomitant decrease in the $pCO_2$ of the waste stream that is contacted with the water. The $CO_2$ charged water is acidic, having a pH of 6 or less, such as 5 or less and including 4 or less. In certain embodiments, the concentration of $CO_2$ of the gas that is used to charge the water is 10% or higher, 25% or higher, including 50% or higher, such as 75% or even higher. Contact protocols of interest include, but are not limited to: direct contacting protocols, e.g., bubbling the gas through the volume of water, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient.

At precipitation step 20, carbonate compounds, which may be amorphous or crystalline, are precipitated. Precipitation conditions of interest include those that change the physical environment of the water to produce the desired precipitate product. For example, the temperature of the water may be raised to an amount suitable for precipitation of the desired carbonate compound(s) to occur. In such embodiments, the temperature of the water may be raised to a value from 5 to 70° C., such as from 20 to 50° C. and including from 25 to 45° C. As such, while a given set of precipitation conditions may have a temperature ranging from 0 to 100° C., the temperature may be raised in certain embodiments to produce the desired precipitate. In certain embodiments, the temperature is raised using energy generated from low or zero carbon dioxide emission sources, e.g., solar energy source, wind energy source, hydroelectric energy source, etc. While the pH of the water may range from 7 to 14 during a given precipitation process, in certain embodiments the pH is raised to alkaline levels in order to drive the precipitation of carbonate compound as desired. In certain of these embodiments, the pH is raised to a level which minimizes if not eliminates $CO_2$ gas generation production during precipitation. In these embodiments, the pH may be raised to 10 or higher, such as 11 or higher. Where desired, the pH of the water is raised using any convenient approach. In certain embodiments, a pH raising agent may be employed, where examples of such agents include oxides, hydroxides (e.g., sodium hydroxide, potassium hydroxide, brucite), carbonates (e.g. sodium carbonate) and the like. The amount of pH elevating agent that is added to the saltwater source will depend on the particular nature of the agent and the volume of saltwater being modified, and will be sufficient to raise the pH of the salt water source to the desired value. Alternatively, the pH of the saltwater source can be raised to the desired level by electrolysis of the water.

$CO_2$ charging and carbonate compound precipitation may occur in a continuous process or at separate steps. As such, charging and precipitation may occur in the same reactor of a system, e.g., as illustrated in FIG. 1 at step 20, according to certain embodiments of the invention. In yet other embodiments of the invention, these two steps may occur in separate reactors, such that the water is first charged with $CO_2$ in a charging reactor and the resultant $CO_2$ charged water is then subjected to precipitation conditions in a separate reactor.

Following production of the carbonate precipitate from the water, the resultant precipitated carbonate compound composition is separated from the mother liquor to produce separated carbonate compound precipitate product, as illustrated at step 40 of FIG. 1. Separation of the precipitate can be achieved using any convenient approach, including a mechanical approach, e.g., where bulk excess water is drained from the precipitated, e.g., either by gravity alone or with the addition of vacuum, mechanical pressing, by filtering the precipitate from the mother liquor to produce a filtrate, etc. Separation of bulk water produces a wet, dewatered precipitate.

The resultant dewatered precipitate is then dried to produce a product, as illustrated at step 60 of FIG. 1. Drying can be achieved by air drying the filtrate. Where the filtrate is air dried, air drying may be at room or elevated temperature. In yet another embodiment, the precipitate is spray dried to dry the precipitate, where the liquid containing the precipitate is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc.

Where desired, the dewatered precipitate product from the separation reactor 40 may be washed before drying, as illustrated at optional step 50 of FIG. 1. The precipitate may be washed with freshwater, e.g., to remove salts (such as NaCl) from the dewatered precipitate. Used wash water may be disposed of as convenient, e.g., by disposing of it in a tailings pond, etc.

At step 70, the dried precipitate is refined, e.g., to provide for desired physical characteristics, such as particle size, surface area, etc., or to add one or more components to the precipitate, such as admixtures, aggregate, supplementary cementitious materials, etc., to produce a final product 80.

In certain embodiments, a system is employed to perform the above methods, where such systems include those described below in greater detail.

Settable Compositions

Additional aspects of the invention are settable compositions, e.g., pure cements, concretes and mortars, which include a hydraulic cement of the invention that includes a carbonate compound composition component, such as a saltwater derived carbonate compound component, e.g., as described above, aggregate and an aqueous fluid, e.g., water. Settable compositions of the invention, such as concretes and mortars, are produced by combining the cement with an amount of aggregate (fine for mortar, e.g., sand; coarse with or without fine for concrete) and water, either at the same time or by pre-combining the cement with aggregate, and then combining the resultant dry components with water. The choice of coarse aggregate material for concrete mixes using cement compositions of the invention may have a minimum size of about ⅜ inch and can vary in size from that minimum up to one inch or larger, including in gradations between these limits. Crushed limestone and other rocks, gravel and the like are coarse aggregates of interest. Finely divided aggregate is smaller than ⅜ inch in size and again may be graduated in much finer sizes down to 200-sieve size or so. Ground limestone and other rocks, sand and the like are fine aggregates of interest. Fine aggregates may be present in both mortars and concretes of the invention. The weight ratio of cement to aggregate in the dry components of the cement may vary, and in certain embodiments ranges from 1:10 to 4:10, such as 2:10 to 5:10 and including from 55:1000 to 70:100.

The liquid phase, e.g., aqueous fluid, with which the dry component is combined to produce the settable composition, e.g., concrete, may vary, from pure water to water that includes one or more solutes, additives, co-solvents, etc., as desired. The ratio of dry component to liquid phase that is combined in preparing the settable composition may vary, and in certain embodiments ranges from 2:10 to 7:10, such as 3:10 to 6:10 and including 4:10 to 6:10.

In certain embodiments, the cements may be employed with one or more admixtures. Admixtures are compositions added to concrete to provide it with desirable characteristics that are not obtainable with basic concrete mixtures or to modify properties of the concrete to make it more readily useable or more suitable for a particular purpose or for cost reduction. As is known in the art, an admixture is any material or composition, other than the hydraulic cement, aggregate and water, that is used as a component of the concrete or mortar to enhance some characteristic, or lower the cost, thereof. The amount of admixture that is employed may vary depending on the nature of the admixture. In certain embodiments the amounts of these components range from 1 to 50% w/w, such as 2 to 10% w/w.

Major reasons for using admixtures are: (1) to achieve certain structural improvements in the resulting cured concrete; (2) to improve the quality of concrete through the successive stages of mixing, transporting, placing, and curing during adverse weather or traffic conditions; (3) to overcome certain emergencies during concreting operations; and (4) to reduce the cost of concrete construction. In some instances, the desired concrete performance characteristics can only be achieved by the use of an admixture. In some cases, using an admixture allows for the use of less expensive construction methods or designs, the savings from which can more than offset the cost of the admixture.

Admixtures of interest include finely divided mineral admixtures. Finely divided mineral admixtures are materials in powder or pulverized form added to concrete before or during the mixing process to improve or change some of the plastic or hardened properties of Portland cement concrete. The finely divided mineral admixtures can be classified according to their chemical or physical properties as: cementitious materials; pozzolans; pozzolanic and cementitious materials; and nominally inert materials. A pozzolan is a siliceous or aluminosiliceous material that possesses little or no cementitious value but will, in the presence of water and in finely divided form, chemically react with the calcium hydroxide released by the hydration of Portland cement to form materials with cementitious properties. Pozzolans can also be used to reduce the rate at which water under pressure is transferred through concrete. Diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Nominally inert materials can also include finely divided raw quartz, dolomites, limestone, marble, granite, and others. Fly ash is defined in ASTM C618.

One type of admixture of interest is a plasticizer. Plasticizers can be added to a concrete to provide it with improved workability for ease of placement with reduced consolidating effort and in reinforced concretes that are required to flow uniformly without leaving void space under reinforcing bars. Also of interest as admixtures are accelerators, retarders, air-entrainers, foaming agents, water reducers, corrosion inhibitors, and pigments. Accelerators are used to increase the cure rate (hydration) of the concrete formulation and are of particular importance in applications where it is desirable for the concrete to harden quickly and in low temperature applications. Retarders act to slow the rate of hydration and increase the time available to pour the concrete and to form it into a desired shape. Retarders are of particular importance in applications where the concrete is being used in hot climates. Air-entrainers are used to distribute tiny air bubbles throughout the concrete. Air-entrainers are of particular value for utilization in regions that experience cold weather because the tiny entrained air bubbles help to allow for some contraction and expansion to protect the concrete from freeze-thaw damage. Pigments can also be added to concrete to provide it with desired color characteristics for aesthetic purposes.

As such, admixtures of interest include, but are not limited to: set accelerators, set retarders, air-entraining agents, defoamers, alkali-reactivity reducers, bonding admixtures, dispersants, coloring admixtures, corrosion inhibitors, dampproofing admixtures, gas formers, permeability reducers, pumping aids, shrinkage compensation admixtures, fungicidal admixtures, germicidal admixtures, insecticidal admixtures, rheology modifying agents, finely divided mineral admixtures, pozzolans, aggregates, wetting agents, strength enhancing agents, water repellents, and any other concrete or mortar admixture or additive. When using an admixture, the fresh cementitious composition, to which the admixture raw materials are introduced, is mixed for sufficient time to cause the admixture raw materials to be dispersed relatively uniformly throughout the fresh concrete.

Set accelerators are used to accelerate the setting and early strength development of concrete. A set accelerator that can be used with the admixture system can be, but is not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulfate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxylalkylamine; a halide salt of an alkali metal or alkaline earth metal (e.g., chloride). Examples of set accelerators that may be used in the present dispensing method include, but are not limited to, POZZOLITH® NC534, nonchloride type set accelerator and/or RHEOCRETE® CNI calcium nitrite-based corrosion inhibitor, both sold under the above trademarks by BASF Admixtures Inc. of Cleveland, Ohio.

Also of interest are set retarding admixtures. Set retarding, also known as delayed-setting or hydration control, admixtures are used to retard, delay, or slow the rate of setting of concrete. They can be added to the concrete mix upon initial batching or sometime after the hydration process has begun. Set retarders are used to offset the accelerating effect of hot weather on the setting of concrete, or delay the initial set of concrete or grout when difficult conditions of placement occur, or problems of delivery to the job site, or to allow time for special finishing processes. Most set retarders also act as low level water reducers and can also be used to entrain some air into concrete. Retarders that can be used include, but are not limited to an oxy-boron compound, corn syrup, lignin, a polyphosphonic acid, a carboxylic acid, a hydroxycarboxylic acid, polycarboxylic acid, hydroxylated carboxylic acid, such as fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates and mixtures thereof. Illustrative examples of retarders are set forth in U.S. Pat. Nos. 5,427,617 and 5,203,919, incorporated herein by reference. A further example of a retarder suitable for use in the admixture system is a hydration control admixture sold under the trademark DELVO® by BASF Admixtures Inc. of Cleveland, Ohio.

Also of interest as admixtures are air entrainers. The term air entrainer includes any substance that will entrain air in cementitious compositions. Some air entrainers can also reduce the surface tension of a composition at low concentration. Air-entraining admixtures are used to purposely entrain microscopic air bubbles into concrete. Air-entrainment dramatically improves the durability of concrete exposed to moisture during cycles of freezing and thawing. In addition, entrained air greatly improves concrete's resistance to surface scaling caused by chemical deicers. Air entrainment also increases the workability of fresh concrete while eliminating or reducing segregation and bleeding. Materials used to achieve these desired effects can be selected from wood resin, natural resin, synthetic resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. Air entrainers are added in an amount to yield a desired level of air in a cementitious composition. Examples of air entrainers that can be utilized in the admixture system include, but are not limited to MB AE 90, MB VR and MICRO AIR®, all available from BASF Admixtures Inc. of Cleveland, Ohio.

Also of interest as admixtures are defoamers. Defoamers are used to decrease the air content in the cementitious composition. Examples of defoamers that can be utilized in the cementitious composition include, but are not limited to mineral oils, vegetable oils, fatty acids, fatty acid esters, hydroxyl functional compounds, amides, phosphoric esters, metal soaps, silicones, polymers containing propylene oxide moieties, hydrocarbons, alkoxylated hydrocarbons, alkoxylated polyalkylene oxides, tributyl phosphates, dibutyl phthalates, octyl alcohols, water-insoluble esters of carbonic and boric acid, acetylenic diols, ethylene oxide-propylene oxide block copolymers and silicones.

Also of interest as admixtures are dispersants. The term dispersant as used throughout this specification includes, among others, polycarboxylate dispersants, with or without polyether units. The term dispersant is also meant to include those chemicals that also function as a plasticizer, water reducer such as a high range water reducer, fluidizer, antiflocculating agent, or superplasticizer for cementitious compositions, such as lignosulfonates, salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins for example LOMAR D® dispersant (Cognis Inc., Cincinnati, Ohio), polyaspartates, or oligomeric dispersants. Polycarboxylate dispersants can be used, by which is meant a dispersant having a carbon backbone with pendant side chains, wherein at least a portion of the side chains are attached to the backbone through a carboxyl group or an ether group. Examples of polycarboxylate dispersants can be found in U.S. Pub. No. 2002/0019459 A1, U.S. Pat. No. 6,267,814, U.S. Pat. No. 6,290,770, U.S. Pat. No. 6,310,143, U.S. Pat. No. 6,187,841, U.S. Pat. No. 5,158, 996, U.S. Pat. No. 6,008,275, U.S. Pat. No. 6,136,950, U.S. Pat. No. 6,284,867, U.S. Pat. No. 5,609,681, U.S. Pat. No. 5,494,516; U.S. Pat. No. 5,674,929, U.S. Pat. No. 5,660,626, U.S. Pat. No. 5,668,195, U.S. Pat. No. 5,661,206, U.S. Pat. No. 5,358,566, U.S. Pat. No. 5,162,402, U.S. Pat. No. 5,798, 425, U.S. Pat. No. 5,612,396, U.S. Pat. No. 6,063,184, U.S. Pat. No. 5,912,284, U.S. Pat. No. 5,840,114, U.S. Pat. No. 5,753,744, U.S. Pat. No. 5,728,207, U.S. Pat. No. 5,725,657, U.S. Pat. No. 5,703,174, U.S. Pat. No. 5,665,158, U.S. Pat. No. 5,643,978, U.S. Pat. No. 5,633,298, U.S. Pat. No. 5,583, 183, and U.S. Pat. No. 5,393,343, which are all incorporated herein by reference as if fully written out below. The polycarboxylate dispersants of interest include but are not limited to dispersants or water reducers sold under the trademarks GLENIUM® 3030NS, GLENIUM® 3200 HES, GLENIUM 3000NS® (BASF Admixtures Inc., Cleveland, Ohio), ADVA® (W. R. Grace Inc., Cambridge, Mass.), VISCOCRETE® (Sika, Zurich, Switzerland), and SUPERFLUX® (Axim Concrete Technologies Inc., Middlebranch, Ohio).

Also of interest as admixtures are alkali reactivity reducers. Alkali reactivity reducers can reduce the alkali-aggregate reaction and limit the disruptive expansion forces that this reaction can produce in hardened concrete. The alkali-reactivity reducers include pozzolans (fly ash, silica fume), blast-furnace slag, salts of lithium and barium, and other air-entraining agents.

Natural and synthetic admixtures are used to color concrete for aesthetic and safety reasons. These coloring admixtures are usually composed of pigments and include carbon black, iron oxide, phthalocyanine, umber, chromium oxide, titanium oxide, cobalt blue, and organic coloring agents.

Also of interest as admixtures are corrosion inhibitors. Corrosion inhibitors in concrete serve to protect embedded reinforcing steel from corrosion due to its highly alkaline nature. The high alkaline nature of the concrete causes a passive and noncorroding protective oxide film to form on steel. However, carbonation or the presence of chloride ions from deicers or seawater can destroy or penetrate the film and result in corrosion. Corrosion-inhibiting admixtures chemically arrest this corrosion reaction. The materials most commonly used to inhibit corrosion are calcium nitrite, sodium nitrite, sodium benzoate, certain phosphates or fluorosilicates, fluoroaluminites, amines and related chemicals.

Also of interest are dampproofing admixtures. Dampproofing admixtures reduce the permeability of concrete that have low cement contents, high water-cement ratios, or a deficiency of fines in the aggregate. These admixtures retard moisture penetration into dry concrete and include certain soaps, stearates, and petroleum products.

Also of interest are gas former admixtures. Gas formers, or gas-forming agents, are sometimes added to concrete and grout in very small quantities to cause a slight expansion prior to hardening. The amount of expansion is dependent upon the amount of gas-forming material used and the temperature of the fresh mixture. Aluminum powder, resin soap and vegetable or animal glue, saponin or hydrolyzed protein can be used as gas formers.

Also of interest are permeability reducers. Permeability reducers are used to reduce the rate at which water under pressure is transmitted through concrete. Silica fume, fly ash, ground slag, natural pozzolans, water reducers, and latex can be employed to decrease the permeability of the concrete.

Also of interest are rheology modifying agent admixtures. Rheology modifying agents can be used to increase the viscosity of cementitious compositions. Suitable examples of rheology modifier include firmed silica, colloidal silica, hydroxyethyl cellulose, hydroxypropyl cellulose, fly ash (as defined in ASTM C618), mineral oils (such as light naphthenic), hectorite clay, polyoxyalkylenes, polysaccharides, natural gums, or mixtures thereof.

Also of interest are shrinkage compensation admixtures. The shrinkage compensation agent which can be used in the cementitious composition can include but is not limited to $RO(AO)_{1-10}H$, wherein R is a $C_{1-5}$ alkyl or $C_{5-6}$ cycloalkyl radical and A is a $C_{2-3}$ alkylene radical, alkali metal sulfate, alkaline earth metal sulfates, alkaline earth oxides, preferably sodium sulfate and calcium oxide. TETRAGUARD® is an example of a shrinkage reducing agent and is available from BASF Admixtures Inc. of Cleveland, Ohio.

Bacteria and fungal growth on or in hardened concrete may be partially controlled through the use of fungicidal and germicidal admixtures. The most effective materials for these purposes are polyhalogenated phenols, dialdrin emulsions, and copper compounds.

Also of interest in certain embodiments are workability improving admixtures. Entrained air, which acts like a lubricant, can be used as a workability improving agent. Other workability agents are water reducers and certain finely divided admixtures.

In certain embodiments, the cements of the invention are employed with fibers, e.g., where one desires fiber-reinforced concrete. Fibers can be made of zirconia containing materials, steel, carbon, fiberglass, or synthetic materials, e.g., polypropylene, nylon, polyethylene, polyester, rayon, high-strength aramid, (i.e. Kevlar®), or mixtures thereof.

The components of the settable composition can be combined using any convenient protocol. Each material may be mixed at the time of work, or part of or all of the materials may be mixed in advance. Alternatively, some of the materials are mixed with water with or without admixtures, such as high-range water-reducing admixtures, and then the remaining materials may be mixed therewith. As a mixing apparatus, any conventional apparatus can be used. For example, Hobart mixer, slant cylinder mixer, Omni Mixer, Henschel mixer, V-type mixer, and Nauta mixer can be employed.

Following the combination of the components to produce a settable composition (e.g., concrete), the settable composition will set after a given period of time. The setting time may vary, and in certain embodiments ranges from 30 minutes to 48 hours, such as 30 minutes to 24 hours and including from 1 hour to 4 hours.

The strength of the set product may also vary. In certain embodiments, the strength of the set cement may range from 5 Mpa to 70 MPa, such as 10 MPa to 50 MPa and including from 20 MPa to 40 MPa. In certain embodiments, set products produced from cements of the invention are extremely durable. e.g., as determined using the test method described at ASTM C1157.

Aspects of the invention further include structures produced from the cements and settable compositions of the invention. Because these structures are produced from cements of the invention, they will include markers or components that identify them as being obtained from a water precipitated carbonate compound composition, such as trace amounts of various elements present in the initial salt water source, e.g., as described above. For example, where the mineral component of the cement component of the concrete is one that has been produced from sea water, the set product will contain a seawater marker profile of different elements in identifying amounts, such as magnesium, potassium, sulfur, boron, sodium, and chloride, etc.

Utility

The subject cements and settable compositions that include the same, find use in a variety of different applications, particularly as building or construction materials. Specific structures in which the settable compositions of the invention find use include, but are not limited to: pavements, architectural structures, e.g., buildings, foundations, motorways/roads, overpasses, parking structures, brick/block walls and footings for gates, fences and poles. Mortars of the invention find use in binding construction blocks, e.g., bricks, together and filling gaps between construction blocks. Mortars can also be used to fix existing structure, e.g., to replace sections where the original mortar has become compromised or erroded, among other uses.

Systems

Aspects of the invention further include systems, e.g., processing plants or factories, for producing the carbonate compound compositions, e.g., saltwater derived carbonate and hydroxide mineral compositions, and cements of the invention, as well as concretes and mortars that include the cements of the invention. Systems of the invention may have any configuration which enables practice of the particular production method of interest.

Figure 2:
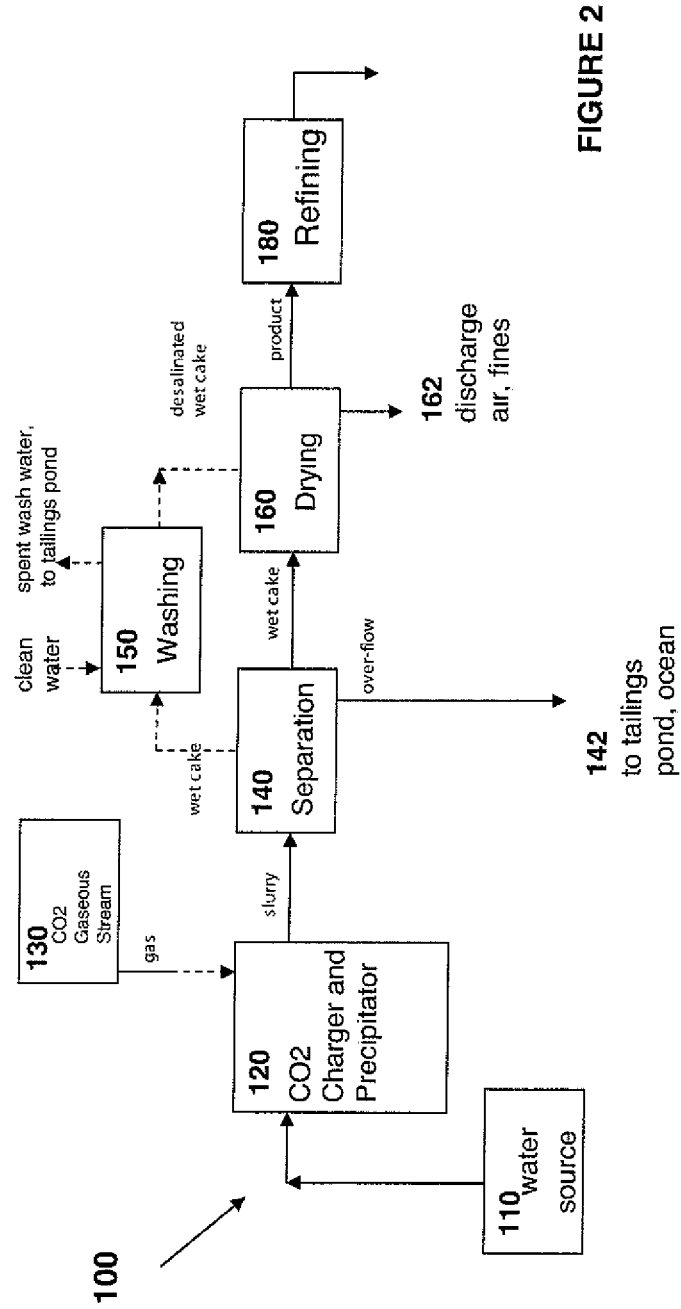
FIG. 2 provides a schematic of a system according to one embodiment of the invention.

FIG. 2 provides a schematic of a system according to one embodiment of the invention. In FIG. 2, system 100 includes water source 110. In certain embodiments, water source 110 includes a structure having an input for salt water, such as a pipe or conduit from an ocean, etc. Where the salt water source that is processed by the system to produce the carbonate compound composition is seawater, the input is in fluid communication with a source of sea water, e.g., such as where the input is a pipe line or feed from ocean water to a land based system or a inlet port in the hull of ship, e.g., where the system is part of a ship, e.g., in an ocean based system.

Also shown in FIG. 2, is $CO_2$ gaseous stream source 130. This source may vary, e.g., such as an industrial plant gaseous stream source, etc., as described above. The water source and the $CO_2$ gaseous stream source are connected to the $CO_2$ charger and precipitator reactor 120. The charger and precipitation reactor 120 may include any of a number of different elements, such as temperature regulators (e.g., configured to heat the water to a desired temperature), chemical additive elements, e.g., for introducing chemical pH elevating agents (such as NaOH) into the water, electrolysis elements, e.g., cathodes/anodes, etc. This reactor 120 may operate as a batch process or a continuous process.

The product of the precipitation reaction, e.g., a slurry, is then processed at a bulk dewatering station 140, as illustrated in FIG. 2. The dewatering station 140 may use a variety of different water removal processes, including processes such as continuous centrifugation, centrifugation, filter centrifugation, gravitational settling, and the like.

The system shown in FIG. 2 also includes a drying station 160 for drying the dewatered precipitate produced at station 140. Depending on the particular drying protocol of the system, the drying station 160 may include a filtration element, freeze drying structure, oven drying, spray drying structure, etc., as described above in more detail.

Also shown is optional washing station 150, where bulk dewatered precipitate from separation station 140 is washed, e.g., to remove salts and other solutes from the precipitate, prior to drying at the drying station 160.

Dried precipitate from station 160 is then sent to refining station 180, where the precipitate may be mechanically processed and/or one or more components may be added to the precipitate (e.g., as reviewed above) to produce a final product.

As indicated above, the system may be present on land or sea. For example, the system may be a land based system that is in a coastal region, e.g., close to a source of sea water, or even an interior location, where water is piped into the system from a salt water source, e.g., ocean. Alternatively, the system may be a water based system, i.e., a system that is present on or in water. Such a system may be present on a boat, ocean based platform etc., as desired.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

EXPERIMENTAL

In the following example, the methodology used to produce a carbonate precipitate from seawater (i.e., the P00099 precipitate), as well as the chemical and physical characteristics of the generated precipitate, are described. In addition, the compressive strengths and shrinkage properties of a blended cement made up of 80% ordinary Portland cement (OPC) and 20% P00099 are reviewed.

I. P00099 Precipitation Process

The following protocol was used to produce the P00099 precipitate. 380 L of filtered seawater was pumped into a cylindrical polyethylene 60°-cone bottom graduated tank. This reaction tank was an open system, left exposed to the ambient atmosphere. The reaction tank was constantly stirred using an overhead mixer. pH, room temperature, and water temperature were constantly monitored throughout the reaction.

25 g of granulated (Ca,Mg)O (a.k.a., dolime or calcined dolomite) was mixed into the seawater. Dolime that settled to the bottom of the tank was manually re-circulated from the bottom of the tank through the top again, in order to facilitate adequate mixing and dissolution of reactants. A second addition of 25 g of dolime was performed in an identical manner, including a manual recirculation of settled reactant. When the pH of the water reached 9.2, a gas mixture of 10% $CO_2$ (and 90% compressed air) was slowly diffused through a ceramic airstone into solution. When the pH of the solution fell to 9.0, another 25 g addition of dolime was added to the reaction tank, which caused the pH to rise again. The additions of dolime were repeated whenever the pH of the solution dropped to 9.0 (or below), until a total of 225 g were added. A manual recirculation of settled reactant was performed in between each dolime addition.

After the final addition of dolime, the continuous diffusion of gas through the solution was stopped. The reaction was stirred for an additional 2 hours. During this time, the pH continued to rise. To maintain a pH between 9.0 and 9.2, additional gas was diffused through the reaction when the pH rose above 9.2 until it reached 9.0. Manual re-circulations of settled reactant were also performed 4 times throughout this 2 hour period.

2 hours after the final addition of dolime, stirring, gas diffusion and recirculation of settled reactant was stopped. The reaction tank was left undisturbed for 15 hours (open to the atmosphere).

After the 15 hour period, supernatant was removed through the top of the reaction tank using a submersible pump. The remaining mixture was removed through the bottom of the tank. The collected mixture was allowed to settle for 2 hours. After settling, the supernatant was decanted. The remaining slurry was vacuum filtered through 11 µm pore size filter paper, in a Büchner funnel. The collected filter cake was placed into a Pyrex dish and baked at 110° C. for 24 hours.

The dried product was ground in a ball mix and fractioned by size through a series of sieves to produce the P00099 precipitate.

II. Materials Analysis

Of the different sieve fractions collected, only the fraction containing particles retained on the 38 µm-opening sieve and passing through the 75 µm-opening sieve was used.

A. Chemical Characteristics

The P00099 precipitate used for the blend were analyzed for elemental composition using XRF. Results for the main elements are reported for the Quikrete type I/II Portland cement used in this blend as well as for the P00099 precipitate. In Table 1, below.

TABLE 1

Table 1: XRF analysis of the type I/II portland cement and P00099-002 used in this blend

| Sample | Na$_2$O % | MgO % | Al$_2$O$_3$ % | SiO$_2$ % | P$_2$O$_5$ ppm | SO$_3$ % | Cl % | K$_2$O % | CaO % | Fe$_2$O$_3$ % | Sr ppm | CO$_3$ % diff. |
|---|---|---|---|---|---|---|---|---|---|---|---|---|
| OPC1 | 2.15 | 1.95 | 4.32 | 20.31 | 2336 | 2.54 | 0.072 | 0.36 | 62.88 | 3.88 | 1099 | 0.002 |
| P00099 | 1.36 | 3.44 | 0.14 | 0.083 | 462 | 0.65 | 1.123 | 0.04 | 45.75 | 0.12 | 3589 | 46.82 |

Figure 3:
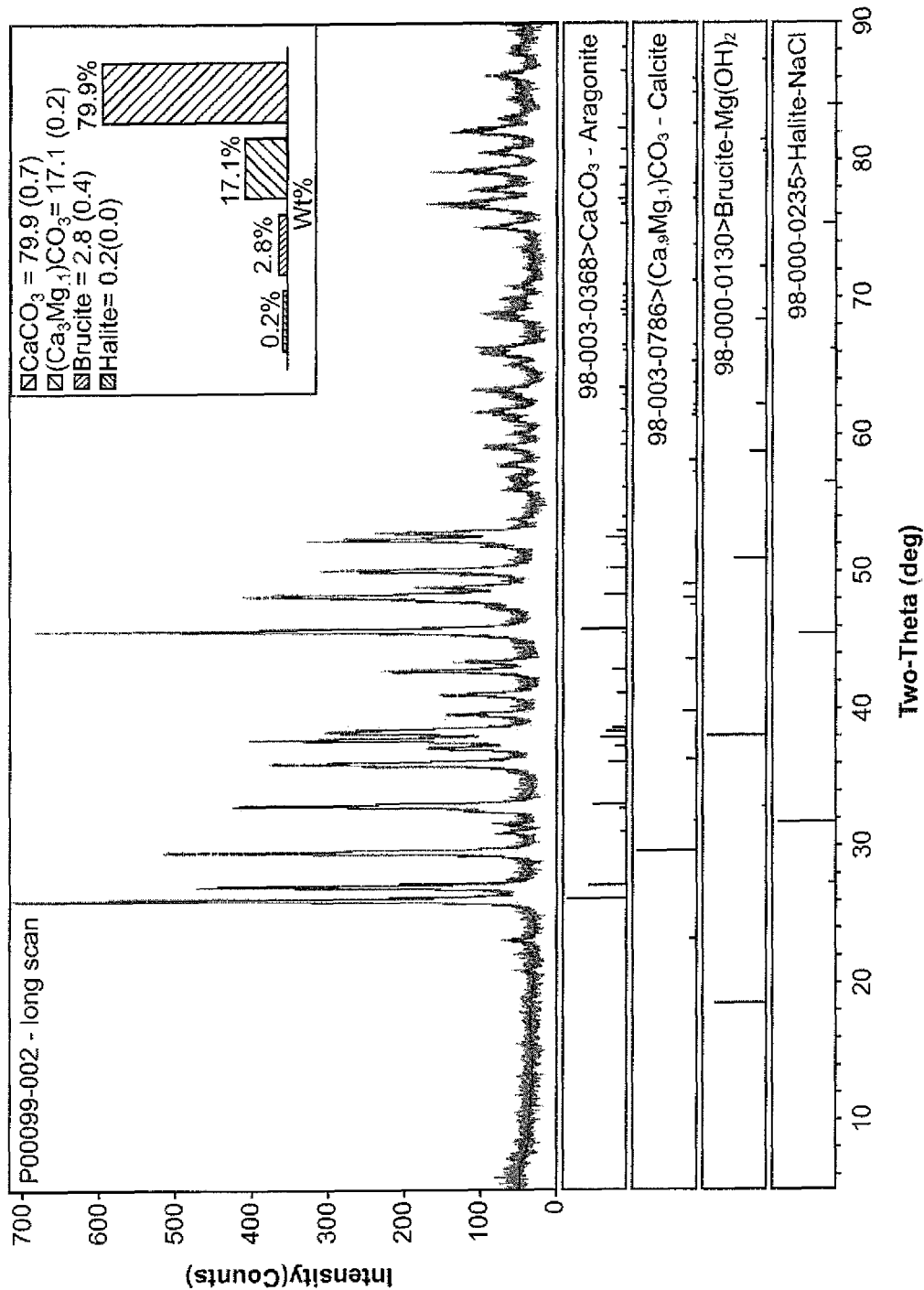
FIG. 3 provides an XRD analysis of the P00099 precipitate reported in the Experimental section, below.
Figure 4:
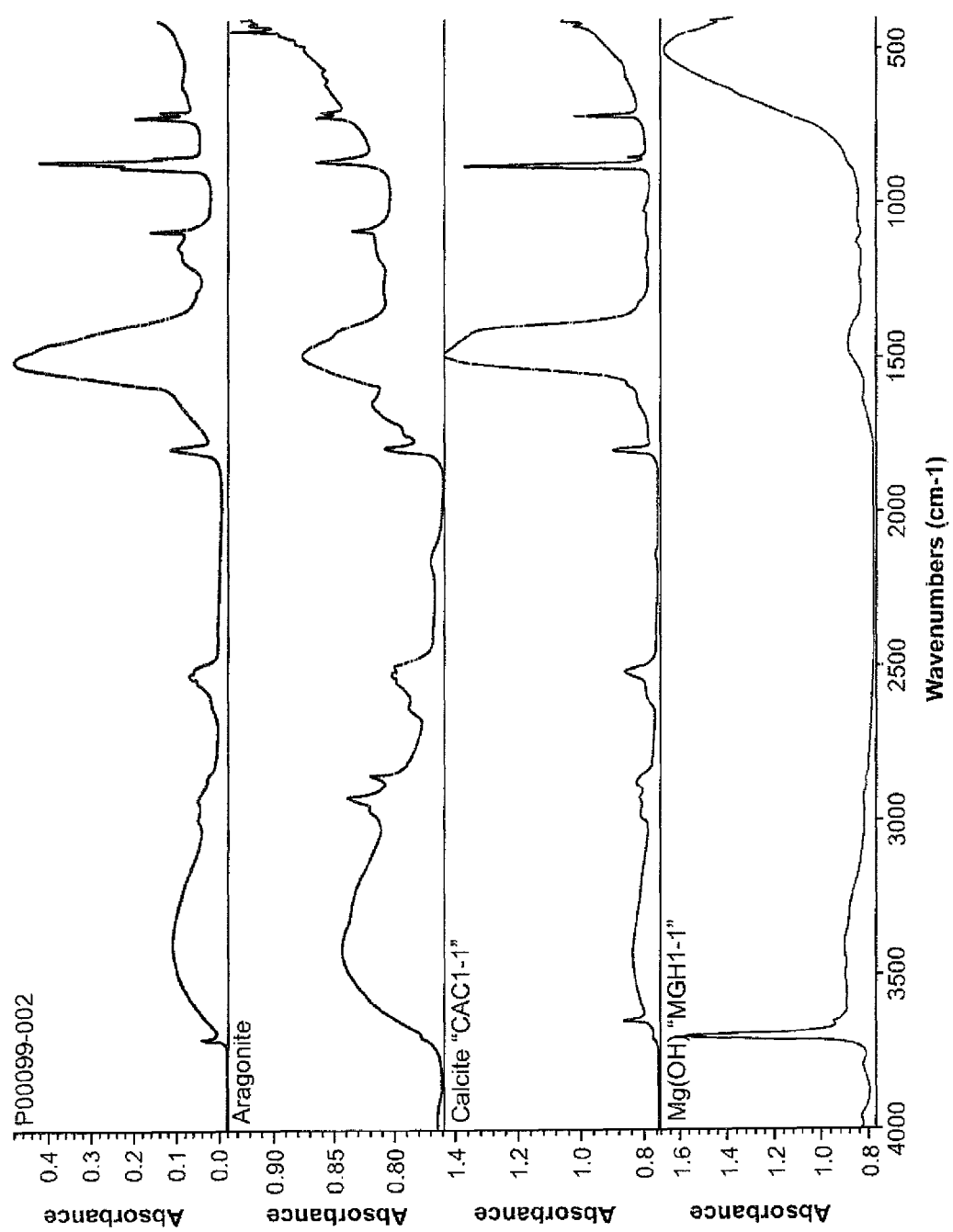
FIG. 4 provides an FT-IR analysis of the P00099 precipitate reported in the Experimental section, below.

The XRD analysis of this precipitate indicates the presence of aragonite and magnesium calcite (composition close to Mg$_{0.1}$Ca$_{0.9}$CO$_3$) and in minor amounts, brucite and halite (Table 2 and FIG. 3). The FT-IR analysis of the P00099 precipitate confirms the presence of aragonite, calcite and brucite (FIG. 4).

TABLE 2

| Sample | Aragonite | Magnesium Calcite | Brucite | Halite |
|---|---|---|---|---|
| P00099 | 79.9 | 17.1 | 2.8 | 0.2 |

The total inorganic carbon content measured by coulometry is in fair agreement with the same value derived from the XRD Rietveld estimated composition coupled with XRF elemental composition. Table 3 provides a coulometric analysis of P00099 compared to % C derived from XRD/XRF data

TABLE 3

| Total C from coulometry | Total C derived from other analytical data |
|---|---|
| 10.93 ± 0.16% | 11.5% |

B. Physical Characteristics

Figure 5A:
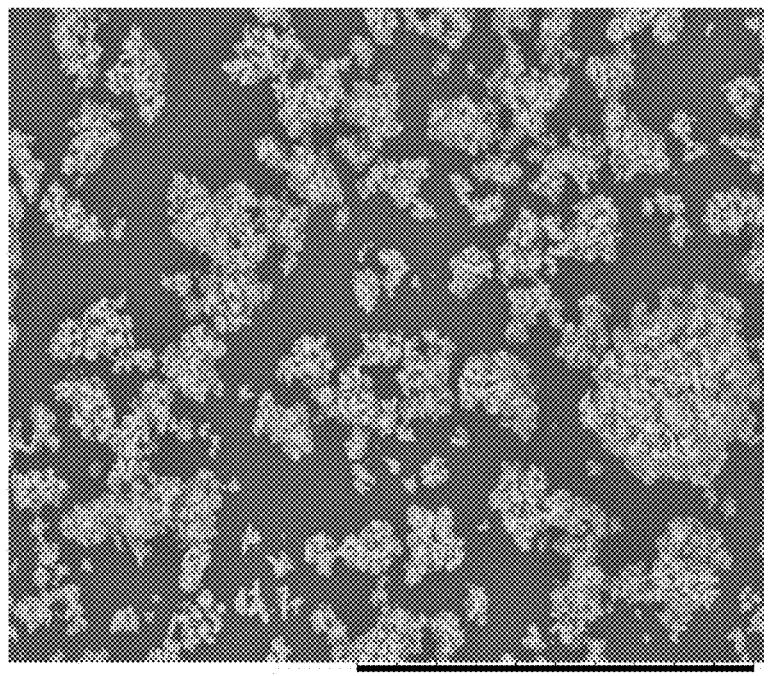
FIGS. 5A and 5B provide SEM observations of the P00099 precipitate reported in the Experimental section, below.
Figure 5B:
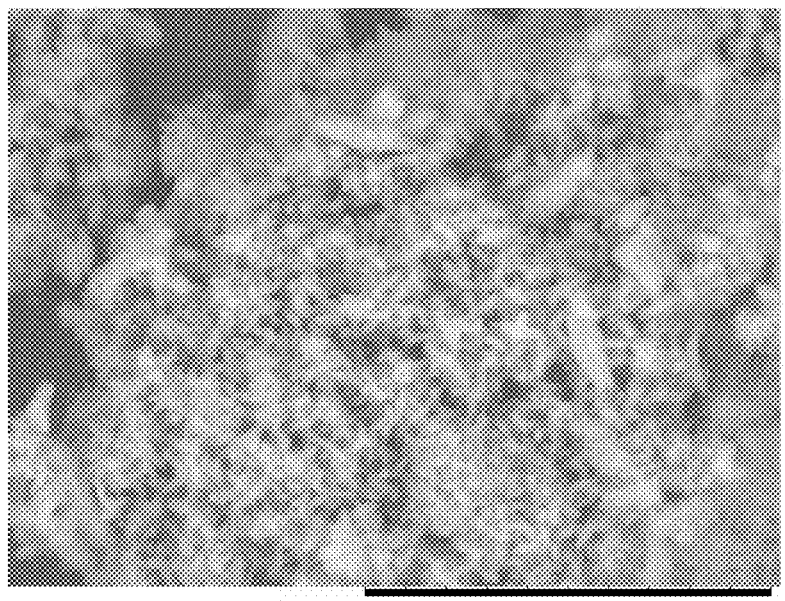

SEM observations (See FIGS. 5A and 5B) on the precipitate confirm the dominance of aragonite (needle-like) as well as the size of the particle agglomerates. The determined BET specific surface areas ("SSA") of the Portland cement and the P00099 precipitate are given in Table 4.

TABLE 4

| Type I/II Quikrete Portland cement | P00099 |
|---|---|
| 1.18 ± 0.04 m$^2$/g | 8.31 ± 0.04 m$^2$/g |

Figure 6:
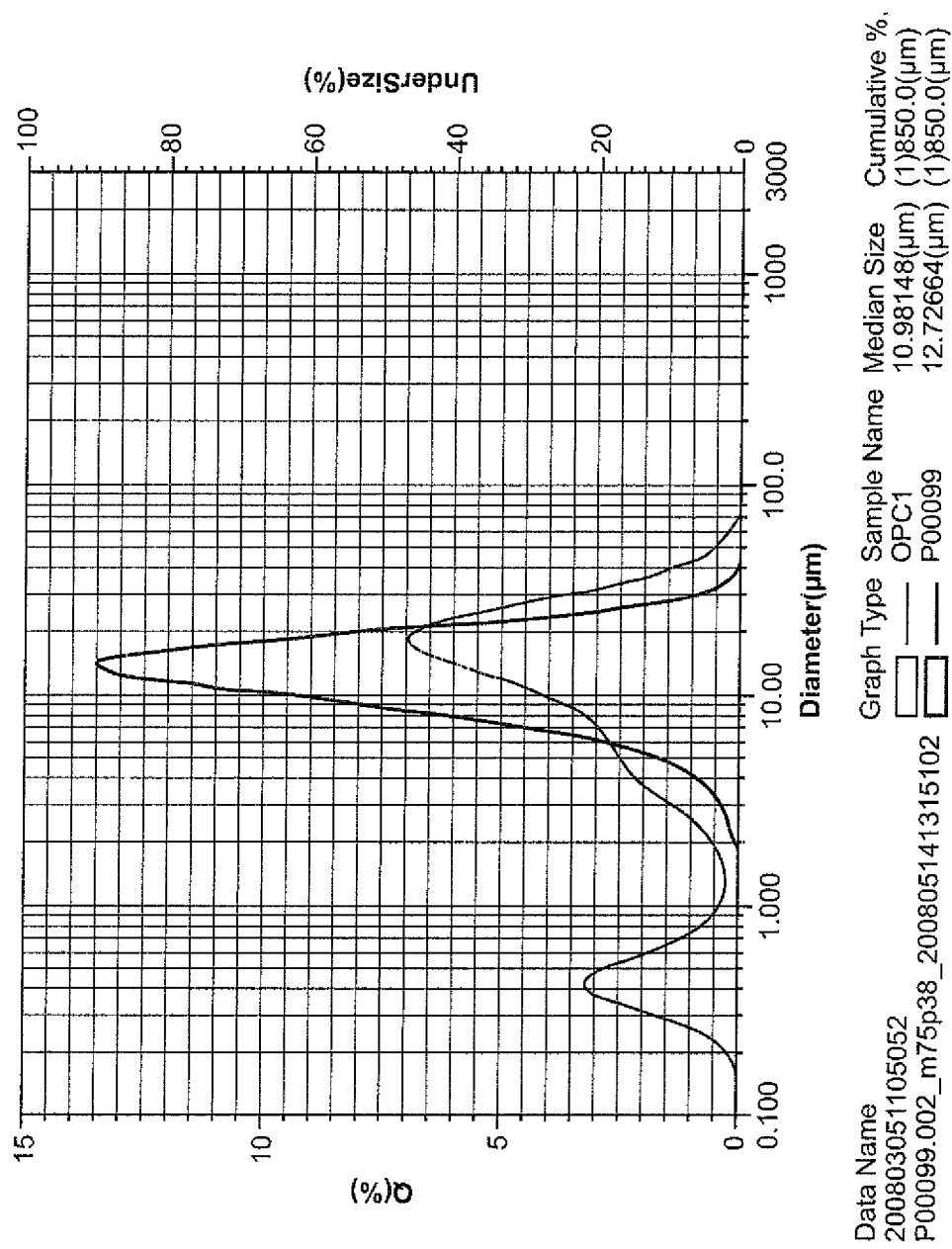
FIG. 6 provides a visual representation of the particle size distribution of the P00099 precipitate.

The particle size distribution was determined after 2 min of pre-sonication to dissociate the agglomerated particles. FIG. 6 provides a visual representation of the particle size distribution of the P00099 precipitate.

III. OPC/P00099 Blended Cement

The P00099 precipitate was blended with ordinary Portland cement (OPC) by hand for approximately two minutes just before mixing the mortar. The blended cement comprised 20% (w/w) P00099 and 80% (w/w) OPC.

A. Compressive Strengths

The compressive strength development was determined according to ASTM C109. Mortar cubes of 2" side were used for the compression tests. A replacement level of 20% was investigated for this precipitate and compared to plain Portland type I/II cement mortars and to Portland type I/II cement substituted by fly ash F. The water:cement ratio was adjusted to 0.58 to meet the flow criterion of 110%+/−5% (value: 107%).

6 cubes were prepared for the blends. Changes to the ASTM C511 storage conditions were as follows:

The cubes were cured under a wet towel for 24 hours (estimated relative humidity of 95%)

After demolding, the cubes were stored in the laboratory at a relative humidity of 30-40% instead of the lime bath.

Figure 7:
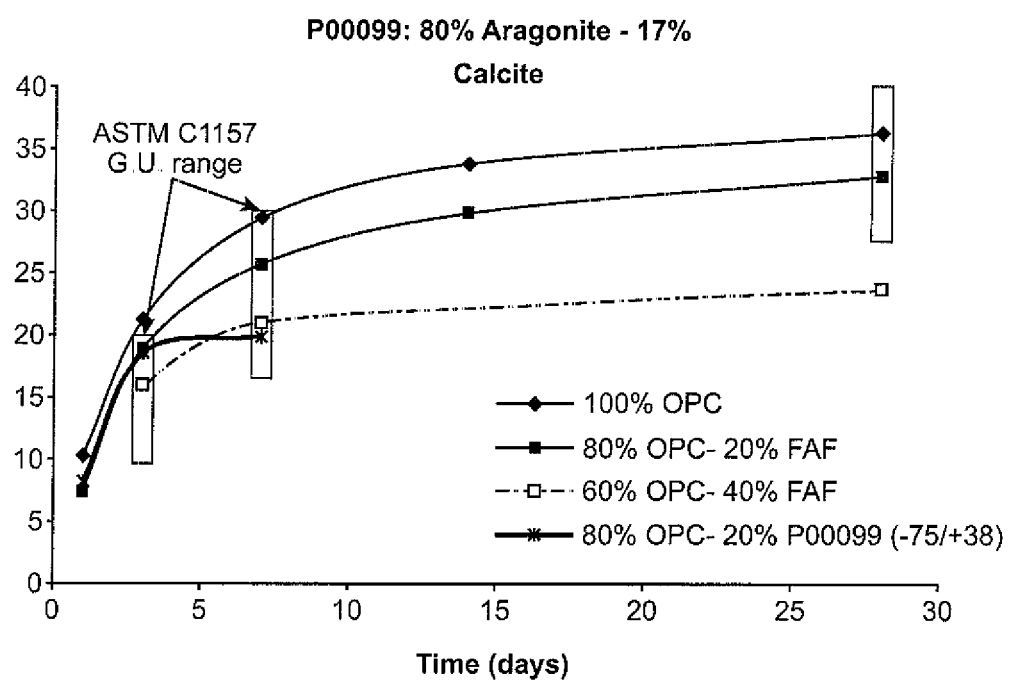
FIGS. 7 and 8 provide results of strength attainment studies with blended cements according to embodiments of the invention.

The results are shown in FIG. 7.

Figure 8:
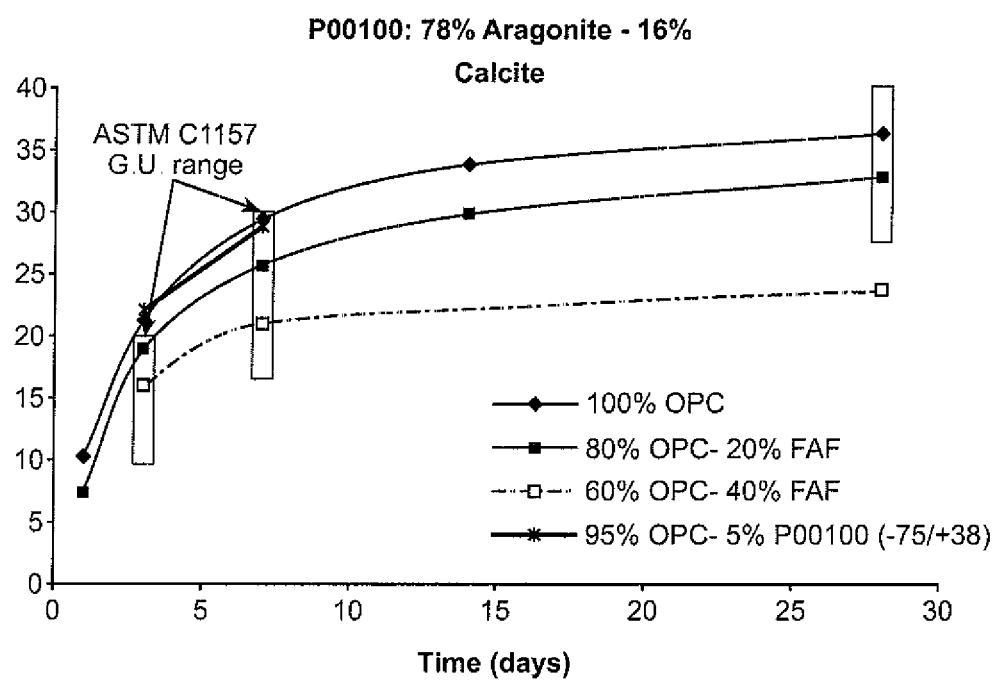

Data for a 5% replacement level was also investigated with a duplicate precipitate (P00100, BET specific surface area of ca. 11 m$^2$/g). The water:cement ratio was adjusted to 0.54 to meet the 110% flow requirement. The results are summarized in FIG. 8. At a 5% level of replacement, the strength development is similar to that of plain Portland cement.

B. Shrinkage

Figure 9:
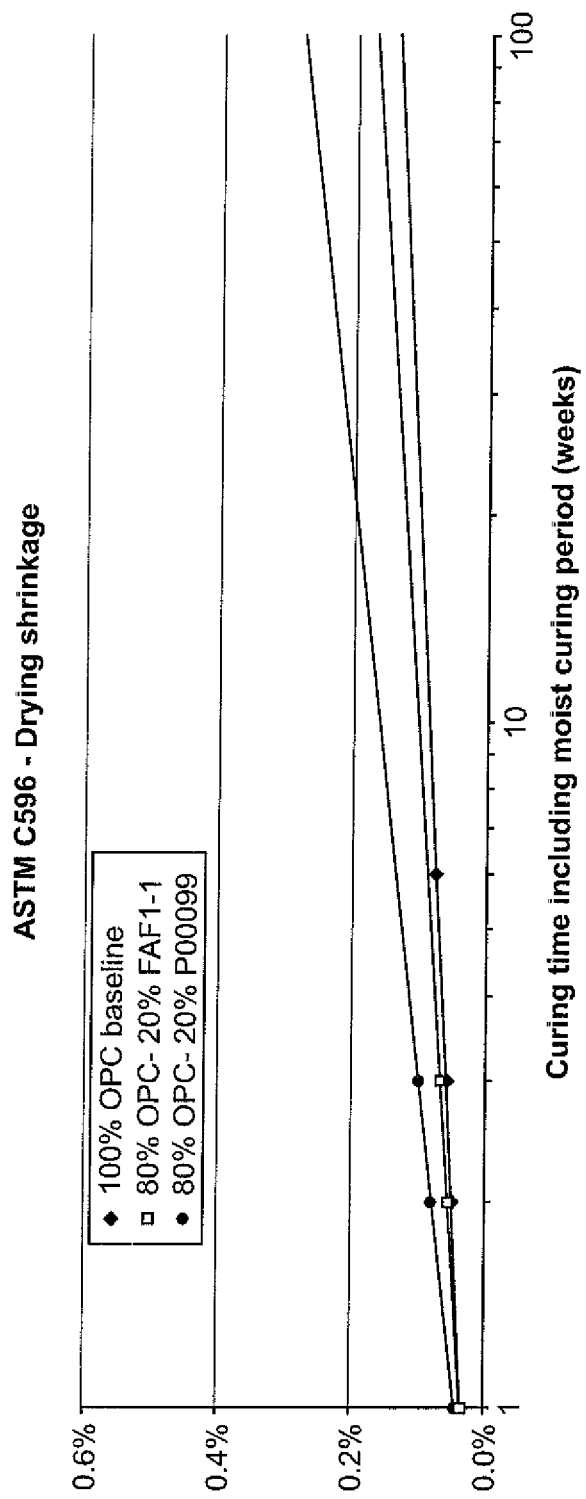
FIG. 9 provides results of a shrinkage study with a blended cement according to an embodiment of the invention.

The drying shrinkage of mortar bars at a replacement level of 20% was investigated for the P00099 precipitate following ASTM C596. It was compared to similar bars made with Portland cement type I/II only or a blend of Portland cement and fly ash F. The water:cement ratio was adjusted to 0.58 to meet the flow criterion of 110%+/−5% (value: 107%). Changes to the ASTM C596 storage conditions were as follows: the relative humidity in the lab is closer to 30-40% than the 50% recommended by ASTM C596, increasing the drying potential. The results are shown in FIG. 9.

The P00099 mix was more prone to drying shrinkage than its plain Portland or Portland-fly ash counterparts due to the larger water:cement ratio.

| Mix description | Approximate composition | W/C | BET SSA (m2/g) | Flow | Duration (weeks) 1 | 2 | 3 | 4 | 6 |
|---|---|---|---|---|---|---|---|---|---|
| 100% OPC baseline | | 0.40 | 1.2 | 105% | 0.034% | 0.052% | 0.056% | | 0.075% |
| 80% OPC- 20% FAF1-1 | | 0.40 | 0.59 | 118% | 0.034% | 0.054% | 0.067% | | |
| 80% OPC - 20% P00099 | 80% aragonite 17% Mg-calcite <3% brucite <1% halite | 0.5 | 8.3 | 118% | 0.043% | 0.080% | 0.099% | | |

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

That which is claiming is::

1. A settable cement composition, comprising greater than 75% w/w crystalline carbonate comprising vaterite wherein said composition upon combination with water, setting, and hardening has a compressive strength in a range of 20-70 MPa wherein said composition comprises strontium in an amount ranging from 3 to 10,000 ppm and wherein said composition is a dry particulate composition.

2. The composition of claim 1, wherein said composition is a hydraulic cement composition.

3. The composition of claim 1, wherein said composition has an average particle size of 0.1 to 100 microns.

4. The composition of claim 1, wherein said carbonate is a metastable carbonate.

5. The composition of claim 1, wherein said carbonate comprises carbon from a gaseous source of carbon dioxide.

6. The composition of claim 5, wherein said gaseous source of carbon dioxide comprises a waste stream or product from an industrial plant selected from power plant, chemical processing plant, or other industrial plant that produces $CO_2$ as a byproduct.

7. The composition of claim 1, wherein said composition comprises calcium, magnesium, or combination thereof.

8. The composition of claim 1, wherein said composition has an average surface area from 0.5 $m^2$/gm to 50 $m^2$/gm.

9. The composition of claim 1, wherein said composition further comprises Portland cement, aggregate, admixture, or combination thereof.

10. The composition of claim 1, wherein said compressive strength is in a range of 20-40 MPa.

11. The composition of claim 1, wherein said settable composition upon combination with water has a setting time of from 30 minutes to 48 hours.

12. The composition of claim 1, wherein said composition further comprises calcium oxide, calcium hydroxide, magnesium oxide, magnesium hydroxide, or combination thereof.

13. The composition of claim 1, wherein said composition further comprises a set retarder.

14. The composition of claim 13, wherein said set retarder is selected from the group consisting of oxy-boron compound, corn syrup, lignin, polyphosphonic acid, carboxylic acid, hydroxycarboxylic acid, polycarboxylic acid, hydroxylated carboxylic acid, borax, lignosulfonates, ascorbic acid, isoascorbic acid, sulphonic acid-acrylic acid copolymer and their corresponding salts, polyhydroxysilane, polyacrylamide, carbohydrates, and mixtures thereof.

15. The composition of claim 14, wherein said hydroxylated carboxylic acid is fumaric, itaconic, malonic, gluconic, or tartaric acid.

16. A building or a construction material, comprising the composition of claim 1.

* * * * *